(12) United States Patent
Arimura et al.

(10) Patent No.: US 7,881,377 B2
(45) Date of Patent: Feb. 1, 2011

(54) IMAGE CODING APPARATUS AND IMAGE CODING METHOD

(75) Inventors: Koji Arimura, Hirakata (JP); Hiroshi Arakawa, Kashiba (JP); Kei Tasaka, Ikoma (JP); Takashi Masuno, Hirakata (JP)

(73) Assignee: Panasonic Corporation, Osaka (JP)

( * ) Notice: Subject to any disclaimer, the term of this patent is extended or adjusted under 35 U.S.C. 154(b) by 1409 days.

(21) Appl. No.: 11/330,245

(22) Filed: Jan. 12, 2006

(65) Prior Publication Data

US 2006/0176962 A1    Aug. 10, 2006

(30) Foreign Application Priority Data

Feb. 7, 2005 (JP) ............................. 2005-031129
Oct. 14, 2005 (JP) ............................. 2005-301015

(51) Int. Cl.
*H04N 7/12* (2006.01)

(52) U.S. Cl. ........................... 375/240.12; 375/240.02; 348/394.1; 348/404.1; 348/412.1; 382/236; 382/239

(58) Field of Classification Search ............ 375/240.13, 375/240.12, 240.01, 240.02; 382/323, 236, 382/239; 348/394.1, 403.1, 404.1, 409.1, 348/412.1
See application file for complete search history.

(56) References Cited

U.S. PATENT DOCUMENTS

| 5,347,309 | A  | * | 9/1994  | Takahashi ............... 375/240.12 |
| 6,025,880 | A  | * | 2/2000  | Nakagawa et al. ..... 375/240.16 |
| 6,591,015 | B1 | * | 7/2003  | Yasunari et al. ............. 382/236 |
| 6,765,964 | B1 | * | 7/2004  | Conklin ................. 375/240.14 |
| 2003/0223645 | A1 | | 12/2003 | Sun et al. |

FOREIGN PATENT DOCUMENTS

JP        2004-140473        5/2004

* cited by examiner

*Primary Examiner*—Dac V Ha
(74) *Attorney, Agent, or Firm*—Wenderoth, Lind & Ponack, L.L.P.

(57) ABSTRACT

An image coding apparatus executes intra-frame prediction with a predetermined intra-frame prediction mode for a certain block. A block selection unit judges that the current block to be coded is a prediction error calculation block or a non-prediction error calculation block. In the case where the current block is a prediction error calculation block, a mode error value calculation unit calculates the prediction error by the sum of absolute differences and for all of the intra-frame prediction modes, an inter-mode comparison unit compares the prediction errors, and as a result of the comparison, an intra-frame prediction mode having the minimum prediction errors is determined as the intra-frame prediction mode. In the case where the current block is a non-prediction error calculation block, the prediction error is not calculated. As an alternative, a prediction mode estimation unit determines the intra-frame prediction mode based on the neighboring prediction mode information stored in a storage unit.

14 Claims, 21 Drawing Sheets

FIG. 6A
| 0 | 1 | 4 | 5 |
| 2 | 3 | 6 | 7 |
| 8 | 9 | 12 | 13 |
| 10 | 11 | 14 | 15 |
FIG. 6B
| 0 | 1 | 4 | 5 |
| 2 | 3 | 6 | 7 |
| 8 | 9 | 12 | 13 |
| 10 | 11 | 14 | 15 |
FIG. 6C
| 0 | 1 | 4 | 5 |
| 2 | 3 | 6 | 7 |
| 8 | 9 | 12 | 13 |
| 10 | 11 | 14 | 15 |
FIG. 6D
| 0 | 1 | 4 | 5 |
| 2 | 3 | 6 | 7 |
| 8 | 9 | 12 | 13 |
| 10 | 11 | 14 | 15 |
FIG. 6E
| 0 | 1 | 4 | 5 |
| 2 | 3 | 6 | 7 |
| 8 | 9 | 12 | 13 |
| 10 | 11 | 14 | 15 |
FIG. 6F
| 0 | 1 | 4 | 5 |
| 2 | 3 | 6 | 7 |
| 8 | 9 | 12 | 13 |
| 10 | 11 | 14 | 15 |
 Prediction error calculation block
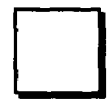 Non-prediction error calculation block

FIG. 7
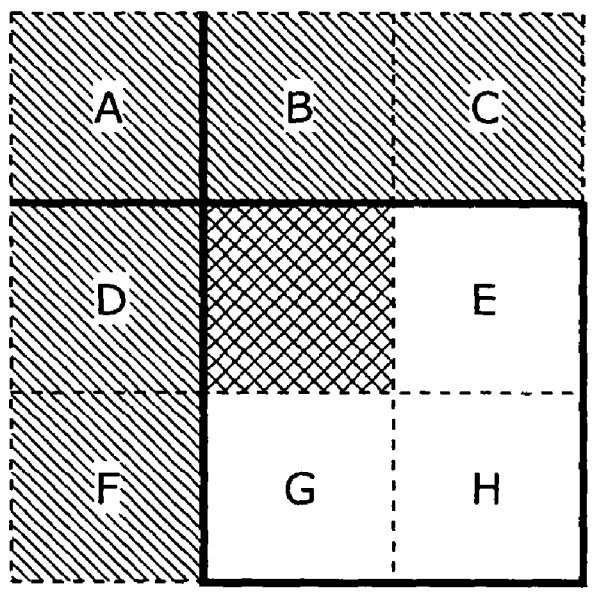
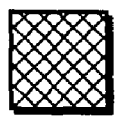 Current 4-by-4 block to be coded (Prediction error is not calculated)
 Coded block (Intra-frame prediction mode has been determined)

☐ Non-prediction error calculation block

▨ Prediction error calculation block

IMAGE CODING APPARATUS AND IMAGE CODING METHOD

BACKGROUND OF THE INVENTION (1) Field of the Invention

The present invention relates to a coding technique for a moving picture. The present invention relates, in particular, to a technique for reducing the amount of operations required for coding the moving picture by a technique that efficiently selects one intra-frame prediction mode out of plural kinds of intra-frame prediction modes in coding the moving picture by the H.264 standard.

(2) Description of the Related Art

In recent years, digitalization of AV information has made great progress, and devices which are capable of handling a digitalized video signal have become popular. Incidentally, the video signal contains a large volume of information, and it is therefore more desirable to code the video signal by reducing the amount of information considering storage volume and transmission efficiency. The international standard H.264 is standardized as an image signal coding technique. In the H.264 standard, an intra-frame prediction to execute prediction in a frame has been introduced.

According to the intra-frame prediction of a 4×4 block in the intra-frame prediction modes of the H.264 standard, a macro block of 16×16 is divided into four segments in both the vertical direction and the horizontal direction respectively so as to make 16 blocks of 4×4 blocks, and then the coding is executed for each divided block. FIG. 1 is a drawing showing the coding sequence for each 4×4 block in a macro block. As shown by numbers in the respective 4×4 blocks in FIG. 1, according to a 4×4 block intra-frame prediction, in a macro block, an 8×8 block on the upper left hand-side is coded firstly, an 8×8 block on the upper right-hand side is coded secondly, an 8×8 block on the lower left hand-side is coded thirdly, and finally an 8×8 block on the lower right-hand side is coded. FIG. 2A is a drawing showing nine intra-frame prediction modes used for the intra coding, while FIG. 2B is a drawing showing respective calculation methods of prediction errors corresponding to the nine intra-frame prediction modes shown in FIG. 2A. There exist 9 kinds of intra-frame prediction modes which are selectable for each 4×4 block, and these modes correspond to the respective different prediction directions as shown in FIG. 2A. Coding is executed by selecting one prediction mode out of the nine prediction modes. It should be noted that by the mode 2, a mean value of luminance of pixels in a coded block (that are the pixels A to D and the pixels I to L) adjacent to the current block for prediction is subtracted from the luminance of each pixel in the current block for prediction, thereby the prediction error of the 4×4 block is calculated. For example by the prediction mode 0 denoted as "0 (vertical)" shown on the upper left-hand side in FIG. 2B, the luminance of the coded pixels A to D in a block adjacent to the upper side of the current 4×4 block for prediction is subtracted respectively from the luminance of pixels on the lower side in vertical direction, the absolute value of the differences are calculated, and then the sum of absolute differences of the luminance of pixels is calculated. More specifically, the luminance of the pixel A is subtracted respectively from the luminance of four pixels on the lower side of the pixel A, and also the luminance of the pixel B is subtracted respectively from the luminance of four pixels on the lower side of the pixel B. In the same way, the luminance of the pixel C and the pixel D are subtracted respectively from the luminance of four pixels on the lower side of the pixel C and the pixel D. Accordingly the sum of absolute differences of the luminance obtained as the result of the subtractions is the prediction error of the prediction mode 0 of the current 4×4 block for prediction. As mentioned above, since the intra-frame prediction is executed by a small block of 4×4, the coding of each block can therefore be executed effectively. However it is necessary to calculate the prediction errors for the respective nine kinds of intra-frame modes and then compare the calculated prediction errors in order to select an optimum intra-frame prediction mode, and therefore a large volume of operations is needed. As a result, the improvement in the speed in coding processing has not been easy. FIG. 3 is a drawing showing a coding sequence of a block by a conventional technique so as to realize the improvement in the processing speed by means of pipeline processing of the intra-frame prediction of 4×4 block. As shown in FIG. 3, there is a suggested method in which the processing sequence by block is changed, and then the pipeline processing is executed, so that the speed of coding processing can be improved (refer to Patent Reference 1).

[Patent Reference 1]

Japanese Laid-Open Patent No. 2004-140473.

In the conventional technique disclosed in the patent reference 1, an efficient operation of a CPU and pipelining are executed so as to improve the processing speed. However the amount of operations is not substantially reduced by this conventional technique, and there exists a problem that the processing speed can not be improved in a device and software in which pipelining is not able to be executed.

SUMMARY OF THE INVENTION

In view of the aforementioned problem, an object of the present invention is to provide an image coding apparatus and an image coding method which realize a reduction of the amount of the operations in selecting the intra-frame prediction mode, so that the improvement in the processing speed is realized.

In order to achieve the aforementioned object, the image coding apparatus of the present invention, executes intra-frame prediction coding using one of a plurality of intra-frame prediction modes each having a different prediction direction for pixels. The image coding apparatus includes a prediction error calculation unit for calculating, using a specific intra-frame prediction mode, a prediction error of at least one block out of a plurality of blocks into which a current frame to be coded is divided.

It should be noted that the present invention can be realized as not only such an image coding apparatus, but also as an image coding method which implements the distinctive units included in the image coding apparatus as steps, and also as program which directs a computer to execute the steps. Moreover, it is obvious that such program can be distributed through a storage medium such as a CD-ROM and a transmission medium such as Internet.

As described above, according to the image coding apparatus and the image coding method of the present invention, it is possible to reduce the amount of processing operations required for selecting the intra-frame prediction mode of the current block to be coded, so that the improvement in processing speed can be realized.

The disclosure of Japanese Patent Application No. 2005-031129 filed on Feb. 7, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6A to FIG. 6F are drawings showing 4×4 blocks divided into prediction error calculation blocks and non-prediction error calculation blocks as examples;

FIG. 7 is a drawing showing the maximum number of the prediction error calculation blocks which are adjacent to one non-prediction error calculation block;

DETAILED DESPRIPTION OF THE INVENTION

First Embodiment

Hereafter a first embodiment of the present invention will be described referring to the respective drawings.

Figure 4:
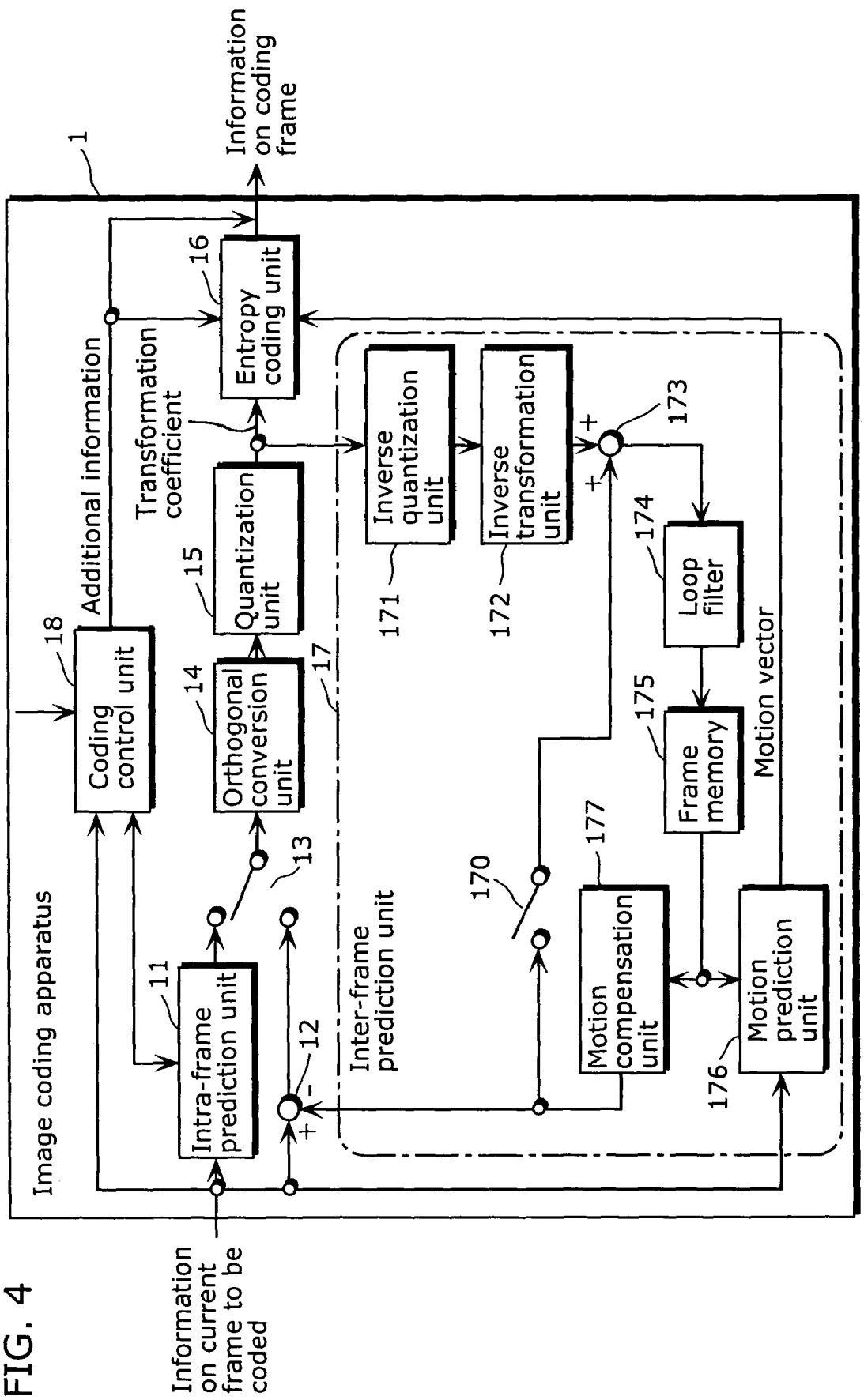
FIG. 4 is a block diagram showing a whole configuration of an image coding apparatus of the present invention.

FIG. 4 is the block diagram showing the whole configuration of an image coding apparatus 1 of the present invention. The image coding apparatus 1 is an apparatus for executing the intra-frame prediction of the present invention, and the image coding apparatus 1 includes an intra-frame prediction unit 11, a difference calculation unit 12, a switch 13, an orthogonal transformation unit 14, a quantization unit 15, an entropy coding unit 16, an inter-frame prediction unit 17 for executing inter-frame prediction, and a coding control unit 18. The inter-frame prediction unit 17 has a switch 170, an inverse quantization unit 171, an inverse transformation unit 172, an adder 173, a loop filter 174, a frame memory 175, a motion prediction unit 176 and a motion compensation unit 177.

When inter-frame prediction is executed, the information on the current frame to be coded is inputted to the difference calculation unit 12. In the difference calculation unit 12, a prediction residual signal can be obtained by calculating the difference between the information on the current frame to be coded and the prediction image signal which is an output of the motion compensation unit 177. The prediction residual signal is outputted to the orthogonal transformation unit 14 and the quantization unit 15. The orthogonal transformation unit 14 executes a frequency transformation of the prediction residual signal. The quantization unit 15 executes image coding processing such as quantization and outputs a transformation coefficient. The transformation coefficient is inputted to the inverse quantization unit 171 and the inverse transformation unit 172, and is executed image decoding processing such as inverse quantization and inverse transformation, as a result a decoded residual signal is obtained. The adder 173 adds the decoded residual signal to the prediction image signal, and generates a reconstructed image signal. The loop filter 174 executes filtering on the generated reconstructed image signal, and then the image signal is stored in the frame memory 175.

The inputted image signal of each macro block which has been read out of the frame memory 175 is also inputted to the motion prediction unit 176. Here, an image area signal value closest to the inputted image signal is detected from among one or more of the coded frame stored in the frame memory 175 which is the target frame to be detected, so as to determine a motion vector indicating the location of the image area and a reference frame index indicating the selected frame at the time of the detection. The motion compensation unit 177 generates a prediction image by extracting an optimum image area out of the coded frames stored in the frame memory 175 using the detected motion vector and the reference frame index obtained by the above processing.

The entropy coding unit 16 executes variable length coding on the coded information such as the motion vector, the reference frame index and the coded residual signal, which are obtained by the series of the above processing, so that a bit stream is obtained.

The aforementioned processing is an operational sequence of the inter-frame prediction coding, and the inter-frame prediction coding and the intra-frame prediction coding can be switched by the switch 3 and the switch 170. In the case of intra-frame prediction coding, a prediction image is not generated by motion compensation, but, as described above, a prediction residual signal is generated by generating the prediction image of the current area to be coded based on the coded area in the same frame and then executing a subtraction. The prediction residual signal is transformed to a coded residual signal in the orthogonal transformation unit 14 and the quantization unit 15 as in the case of the inter-frame prediction coding, and is coded in the variable length manner in the entropy coding unit 16, and then a bit stream to be outputted is obtained. A coding control unit 18 controls the operation of each processing unit in the aforementioned image coding apparatus 1.

Figure 5:
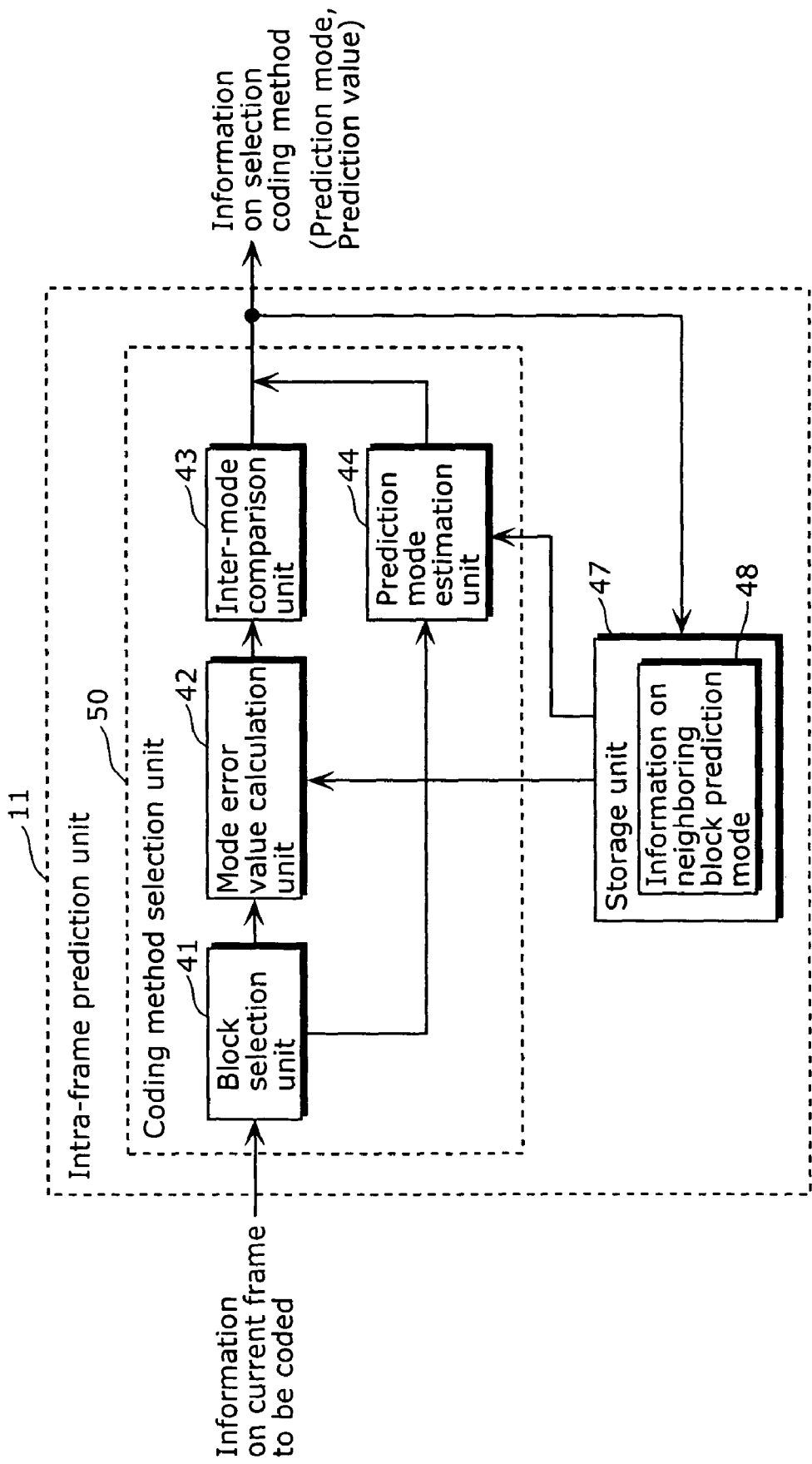
FIG. 5 is a block diagram showing a configuration of an intra-frame prediction unit for a first embodiment of the present invention.

FIG. 5 is a block diagram showing the configuration of the intra-frame prediction unit 11 for the first embodiment of the present invention. The intra-frame prediction unit 11 is a processing unit which calculates prediction errors of only some of 4×4 blocks included in a 16×16 macro block, and determines an intra-frame prediction mode without calculating the prediction errors for all of the intra-frame prediction modes. The intra-frame prediction unit 11 includes a block selection unit 41, a mode error value calculation unit 42, an inter-mode comparison unit 43, a prediction mode estimation unit 44 and a storage unit 47. In the storage unit 47, neighboring block prediction mode information 48 indicating the intra-frame prediction modes employed in the coded neighboring blocks are stored, and also the pixel values of the coded neighboring blocks including 1) pixel values of the lower-most row of the coded macro block which is adjacent to the upper-side of the current macro block and 2) pixel values of the right-most column of the coded macro block which is adjacent to the left-hand side of the current macro block, and 16×16 pixel values of the current macro block are stored.

Here a prediction error calculation unit corresponds to the prediction mode estimation unit 44, a mode determination unit corresponds to the block selection unit 41, the mode error value calculation unit 42, and the inter-mode comparison unit 43, while a mode selection unit corresponds to the block selection unit 41 and the prediction mode estimation unit 44.

Image information of the current frame to be coded is inputted to the block selection unit 41 from an external apparatus.

In the block selection unit 41, the current block to be coded is divided into prediction error calculation block for determining an intra-frame prediction mode by calculating a prediction error and non-prediction error calculation block for determining an intra-frame prediction mode without calculating a prediction error. In fact in the block selection unit 41, one or more division patterns which indicate the arrangements of the prediction error calculation blocks and the non-prediction error calculation blocks are stored in advance. The "division" is executed by determining one of the division patterns. FIG. 6A to FIG. 6F are drawings showing examples that 4×4 blocks are divided into prediction error calculation blocks and non-prediction error calculation blocks. The numbers in the respective 4×4 blocks denote the sequence of coding. And more specifically, FIG. 6A shows a case where the prediction error is calculated only for the pixel located on the upper left-hand side, while the prediction errors are not calculated for the other three pixels. FIG. 6B shows a case where the prediction errors are calculated only for the two pixels located on the upper left-hand side and the lower left-hand side, and the prediction errors are not calculated for the other two pixels. FIG. 6C shows a case where the prediction errors are calculated only for the two pixels located on the upper side of the 4×4 block, while the prediction errors are not calculated for the other two pixels on the lower side. FIG. 6D shows a case where the prediction errors are calculated for the three pixels except the one pixel located on the lower right-hand side of the 4×4 block. FIG. 6E shows a case where the prediction errors are calculated for the seven pixels located on the uppermost side and the leftmost side in the 16×16 macro block. FIG. 6F shows a case where the prediction errors are calculated for the two pixels located on the upper left-hand side and the lower right-hand side of the 4×4 block like a check pattern. As shown in FIG. 6A to FIG. 6F, with respect to the prediction error calculation block and the non-prediction error calculation block, the number of blocks for which the prediction errors are calculated are different depending on division pattern. In the block selection unit 41, the combination patterns of the prediction error calculation block and the non-prediction error calculation block in a macro block are stored in advance, and the prediction error calculation blocks and non-prediction error calculation blocks are determined by considering the processing load of a coding method selection unit 50 and the amount of processing operations of the respective combination patterns. For example in the case where the processing load of the coding method selection unit 50 is high, the division pattern with high proportion of the non-prediction error calculation block is selected. On the other hand, in the case where the processing load of the coding method selection unit 50 is relatively low, the division pattern with high proportion of the prediction error calculation block is selected. These are only examples of the options and the options are not limited to these examples. Additionally the macro block in the same frame may employ either the same division pattern, or the different division patterns for the entire block.

The mode error value calculation unit 42 calculates, using the current frame information for the current block to be coded determined as the prediction error calculation block, the prediction errors for the respective intra-frame prediction modes, which are selectable for the current block to be coded.

The sum of absolute differences (SAD) and the sum of squared differences (SSD) are generally used for the prediction error.

Next, the inter-mode comparison unit 43 compares the prediction errors for the respective intra-frame prediction modes, and determines a prediction error having the minimum value. The intra-frame prediction mode corresponding to the prediction error is determined as the intra-frame prediction mode of the current block to be coded which has been determined as the prediction error calculation block.

The prediction mode estimation unit 44 determines the intra-frame prediction mode of the current block to be coded using the prediction mode information of the neighboring blocks of the current block to be coded, in the case where the current block to be coded has been determined as the non-prediction error calculation block. Here, the prediction error calculations for all of selectable intra-frame prediction mode are not executed respectively, so that the amount of the processing operations can be reduced.

FIG. 7 is a drawing showing the maximum number of the prediction error calculation blocks which are adjacent to one non-prediction error calculation block. And more specifically, the prediction mode estimation unit 44 uses the intra-frame prediction mode of the coded block in selecting the intra-frame prediction mode of the non-prediction error calculation block. With respect to the selection of the intra-frame prediction mode for the non-prediction error calculation block, there is a method that the intra-frame prediction mode of the block, for which the intra-frame prediction mode has already been determined, is used without change.

Now FIG. 7 shows a case that the number of blocks whose intra-frame prediction modes has already been determined is the maximum for the neighboring blocks of the current block to be coded. For example in the case where the current 4×4 block to be coded is located on the upper left-hand side or the upper right-hand side of a macro block, the intra-frame prediction modes for the five blocks A, B, C, D and F have already been determined. On the other hand, in the non-prediction error calculation block indicated by half-tone dot meshing in FIG. 7, one of the coding modes in the block whose intra-frame prediction mode has already been determined is selected, and the prediction mode is used for the current block to be coded.

In the case where plural prediction error calculation blocks exist in the neighboring blocks as shown in FIG. 7, the following methods are available:

(1) a method of selecting the intra-frame prediction mode of the block located on the fixed position relative to the current block to be coded (in other words, selecting the intra-frame prediction mode of the prediction error calculation block located on the fixed position relative to the non-prediction error calculation block);

(2) a method of selecting the intra-frame prediction mode with the smallest mode number from among the intra-frame prediction modes which have been determined for the prediction error calculation blocks;

(3) a method of selecting the intra-frame prediction mode whose evaluated value of SAD and the like for the prediction error calculation block is the minimum value;

(4) a method of selecting the intra-frame prediction mode, which is the most selected mode for the neighboring blocks, from among the intra-frame prediction modes which have been determined for the prediction error calculation blocks; and (5) a method of selecting the intra-frame prediction mode having the minimum value from among the sum of the evaluated values for the respective intra-frame prediction modes calculated for the prediction error calculation blocks.

Figure 8:
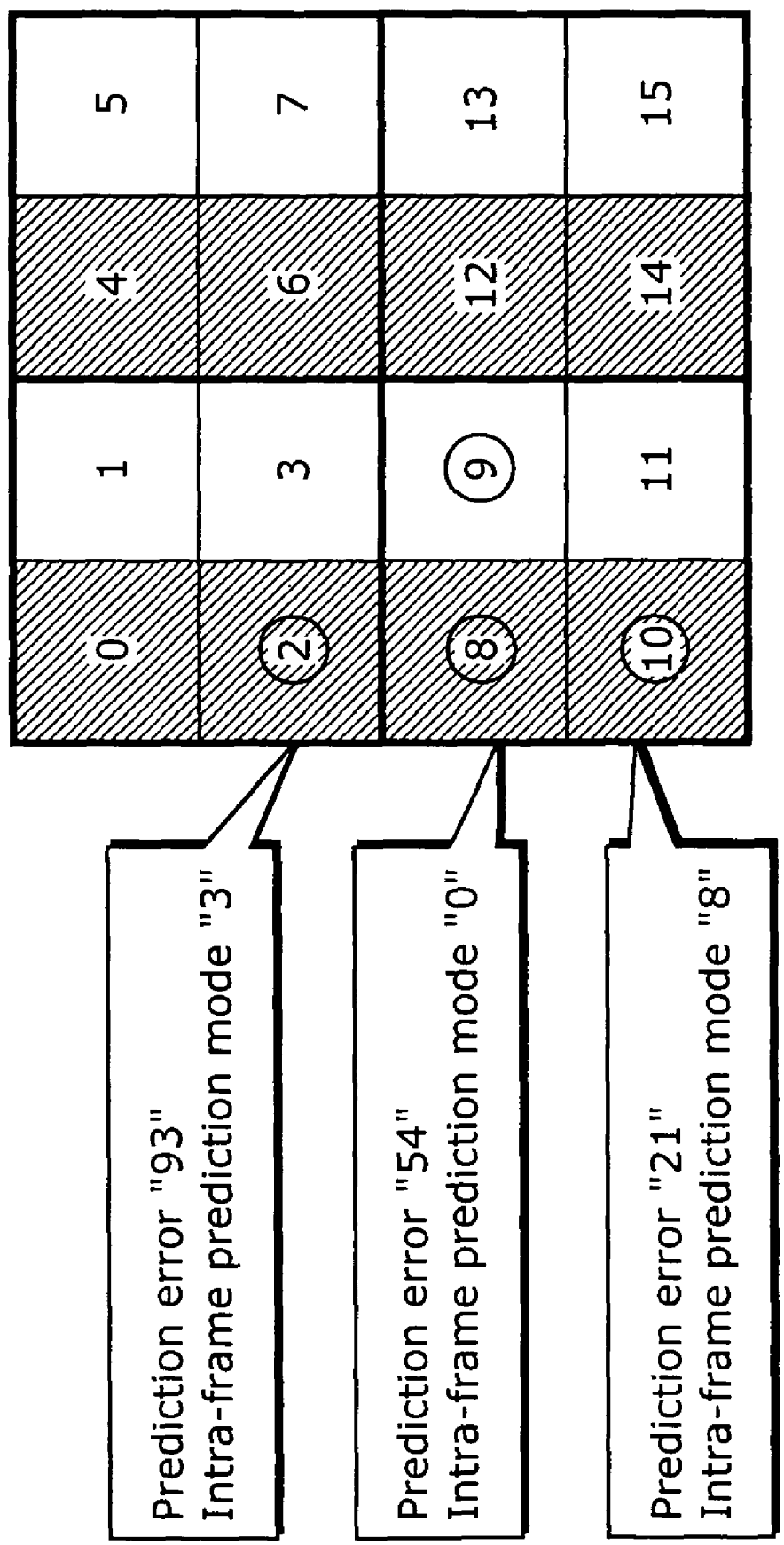
FIG. 8 is a drawing showing an example that an intra-frame prediction mode for the non-prediction error calculation block is selected from among the neighboring coded blocks.

FIG. 8 is a drawing showing an example that an intra-frame prediction mode for the non-prediction error calculation block is selected from among the neighboring coded blocks. Here it will be described about a case that the intra-frame prediction mode for the current 4×4 block 9 to be coded at the 9th in the sequence of coding is selected from among the intra-frame prediction modes determined for the neighboring blocks 2, 8, and 10 for which the prediction errors have already been calculated. It should be noted that the 4×4 block to be coded at the 10th in the sequence of coding is supposed to be coded before the 4×4 block to be coded at the 9th in the sequence of coding so as to select the intra-frame prediction mode of the 4×4 block at the 9th in the sequence of coding.

For example according to (1) the method of selecting the intra-frame prediction mode for the block located on the fixed position described in FIG. 7, when it is defined that "the intra-frame prediction mode for the block located leftwardly adjacent to the current block to be coded is selected", the 9th 4×4 block selects the intra-frame prediction mode "0" determined for the 8th 4×4 block, which is located leftwardly adjacent to the 9th block. And likewise, when it is defined that "the intra-frame prediction mode for the block located on the upper left-hand side of the current block to be coded is selected", the intra-frame prediction mode "3" for the second 4×4 block is selected.

Furthermore according to (2) the method of selecting the intra-frame prediction mode with the smallest mode number among neighboring plural prediction error calculation blocks, for example in the case where the intra-frame prediction mode "3" is determined for the second 4×4 block, the intra-frame prediction mode "0" is determined for the 8th 4×4 block and the intra-frame prediction mode "8" is determined for the 10th 4×4 block, the intra-frame prediction mode "0" which is determined for the 8th 4×4 block is selected for the 9th 4×4 block. According to the H.264 standard, in the case where the intra-frame prediction mode is coded, when a smaller mode number between the macro blocks upwardly and leftwardly adjacent to the current block to be coded is selected, the coding can be executed with less bits. In fact, this method is effective when the macro blocks located upwardly and leftwardly adjacent to the current block to be coded are selected as the prediction error calculation blocks.

Furthermore according to (3) the method of selecting the intra-frame prediction mode whose evaluated value of SAD and the like for the prediction error calculation block is the minimum value among neighboring plural prediction error calculation blocks, for example in the case where the prediction error is "93" and the intra-frame prediction mode "3" is determined for the second 4×4 block, the prediction error is "54" and the intra-frame prediction mode "0" is determined for the 8th 4×4 block, and the prediction error is "21" and the intra-frame prediction mode "8" is determined for the 10th 4×4 block, the intra-frame prediction mode "8", which has been determined for the 10th 4×4 block with the smallest prediction error among the three blocks, is selected.

Figure 9:
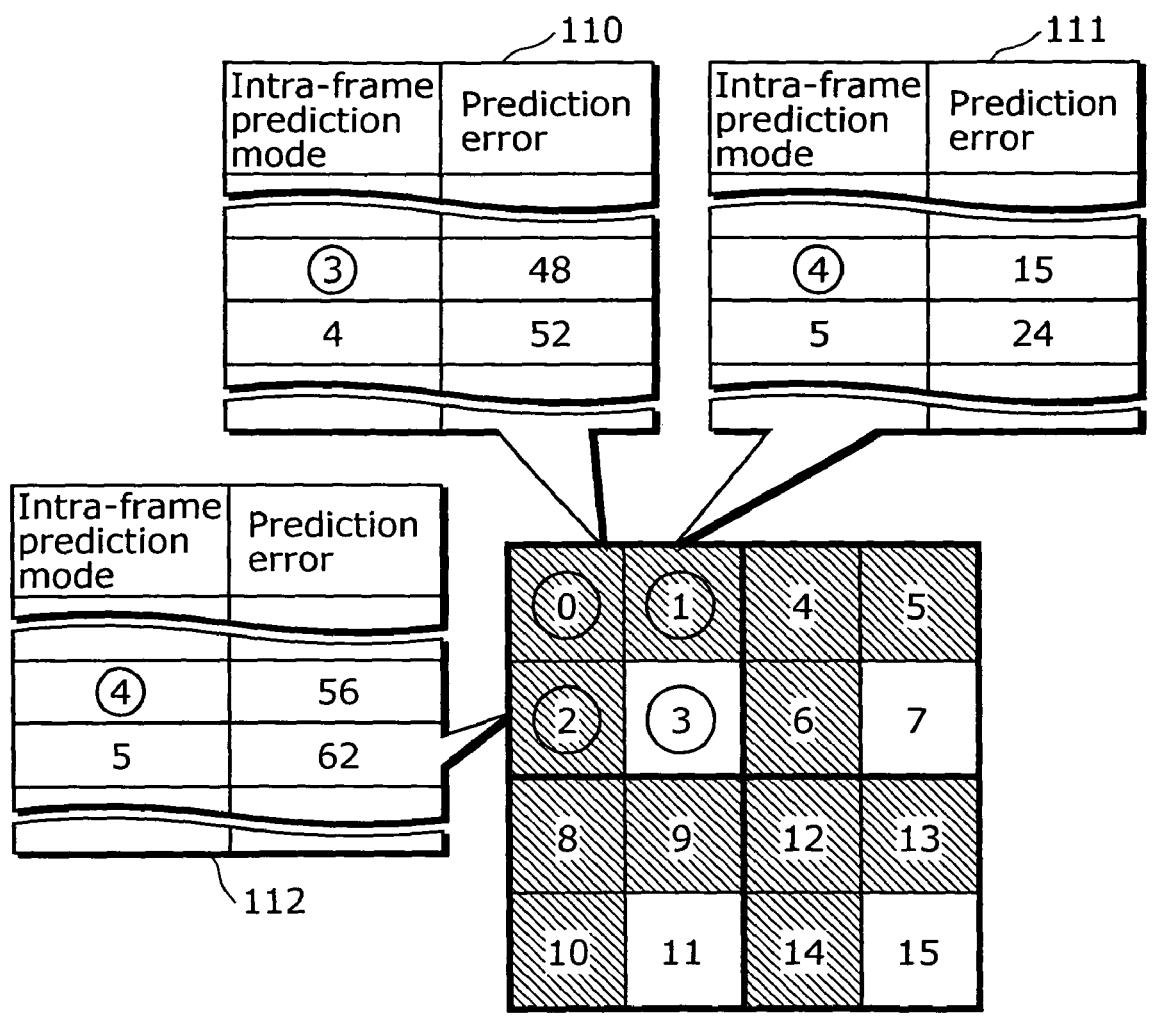
FIG. 9 is a drawing showing another example that the intra-frame prediction mode for the non-prediction error calculation block is selected from among the neighboring blocks.

FIG. 9 is a drawing showing another example that the intra-frame prediction mode for the non-prediction error calculation block is selected from among the neighboring blocks. Here it will be described about a case that the intra-frame prediction mode for the current 4×4 block to be coded at the 3rd in the sequence of coding is selected from among the intra-frame prediction modes which have already been determined for the neighboring blocks 0, 1 and 2 whose prediction errors have already been calculated. With respect to the neighboring blocks 0, 1 and 2 which prediction errors have already been calculated, the tables 110, 111 and 112, which indicate the prediction errors for the respective intra-frame prediction modes, are created, and are stored as the neighboring block prediction mode information 48 in the storage unit 47.

According to (4) the method of selecting the intra-frame prediction mode, which is the most selected mode for the neighboring blocks, among the intra-frame prediction modes which have been determined for the prediction error calculation blocks, the intra-frame prediction mode "4" is selected for the two blocks (the selected prediction modes are circled in FIG. 9), and therefore the intra-frame prediction mode "4" is selected for the third block in FIG. 9.

Next, according to (5) the method of selecting the intra-frame prediction mode having the minimum value among the sum of the evaluated values for the respective intra-frame prediction mode calculated for the prediction error calculation blocks, in FIG. 9, the evaluated values of the 0th block, the first block and the second block are summed up for the respective intra-frame prediction modes 0 to 9, and then the intra-frame prediction mode whose additional value is the minimum value is selected as the intra-frame prediction mode of the third block.

For example it is assumed that the prediction error value of each intra-frame prediction mode M for the kth block is E (k, M). Note that M represents the intra-frame prediction modes 0 to 9. The equation of the additional value S (M) of each intra-frame prediction mode is as follows:

$$S(M) = \Sigma_{k=0 \; to \; 3} E(k, M)$$

Accordingly the intra-frame prediction mode M, of which the value of S(M) has the minimum value, is selected as the intra-frame prediction mode for the third block.

Figure 10:
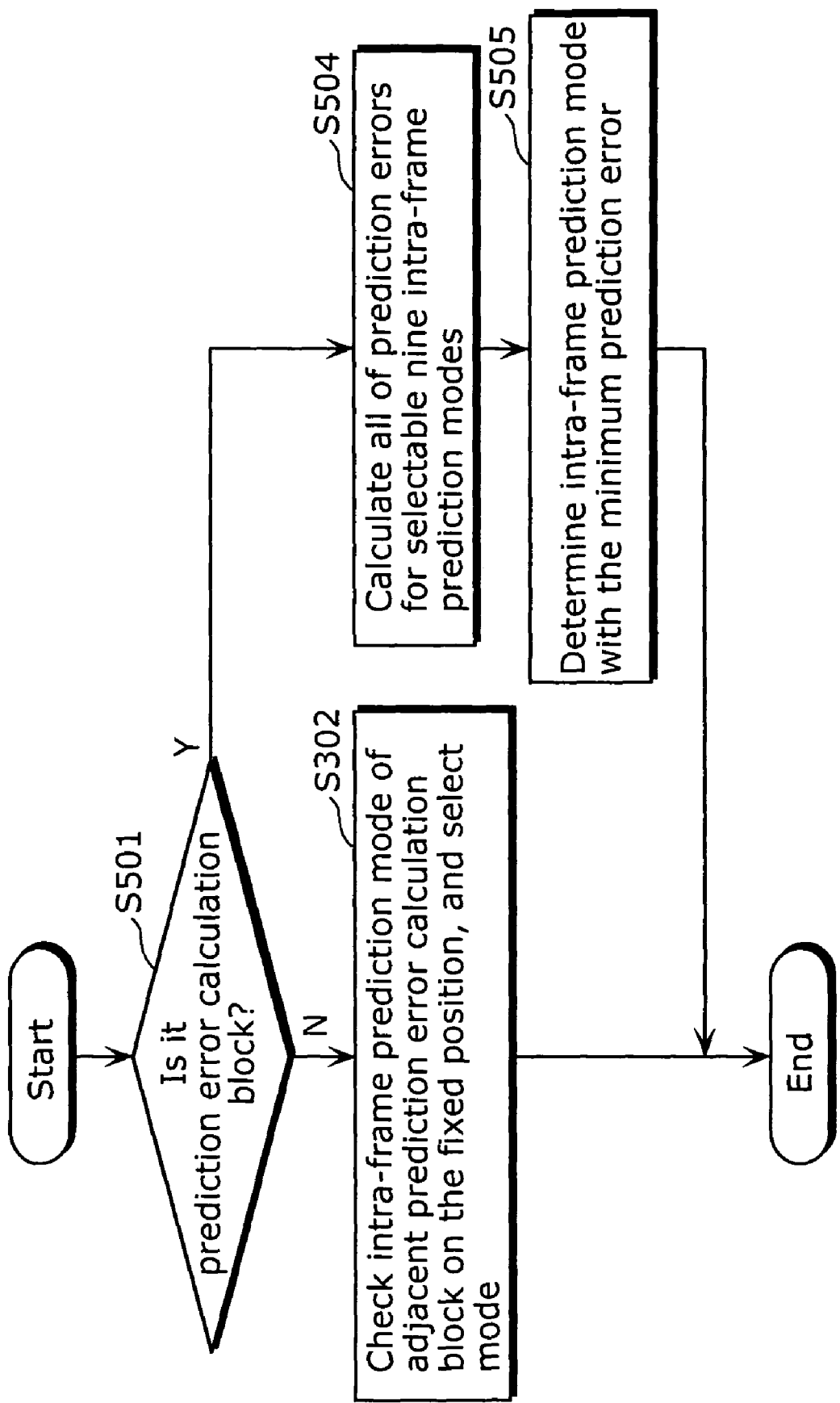
FIG. 10 is a flowchart showing a sequence of selecting the intra-frame prediction mode by the method (1)

FIG. 10 is a flowchart showing a sequence of selecting the intra-frame prediction mode by the method (1) in the macro block shown in FIG. 8. The method (1) is the method of selecting the intra-frame prediction mode for the block located on the fixed position relative to the current block to be coded, from among the neighboring plural prediction error calculation blocks. The block selection unit 41 determines whether or not the 4×4 blocks in the macro block are to be the prediction error calculation blocks (S501). In the case where the 4×4 block is not to be the prediction error calculation block, in other words, the 4×4 block is determined as the non-prediction error calculation block, the prediction mode estimation unit 44 checks the intra-frame prediction mode for the coded prediction error calculation block located on the adjacent fixed position relative to the non-prediction error calculation block (S302). In the case where the block selection unit 41 determines that the 4×4 blocks in the macro block are to be the prediction error calculation blocks (S501), the mode error value calculation unit 42 calculates, using the information on the current frame to be coded, the prediction errors for the respective intra-frame prediction modes, which are selectable for the block, among nine intra-frame prediction modes (S504). The inter-mode comparison unit 43 compares the prediction errors for the respective intra-frame prediction modes, and determines the prediction error having the minimum value. The intra-frame prediction mode corresponding to the prediction error is determined as the intra-frame prediction mode for the current block to be coded which has been determined as the prediction error calculation block (S505).

Figure 11:
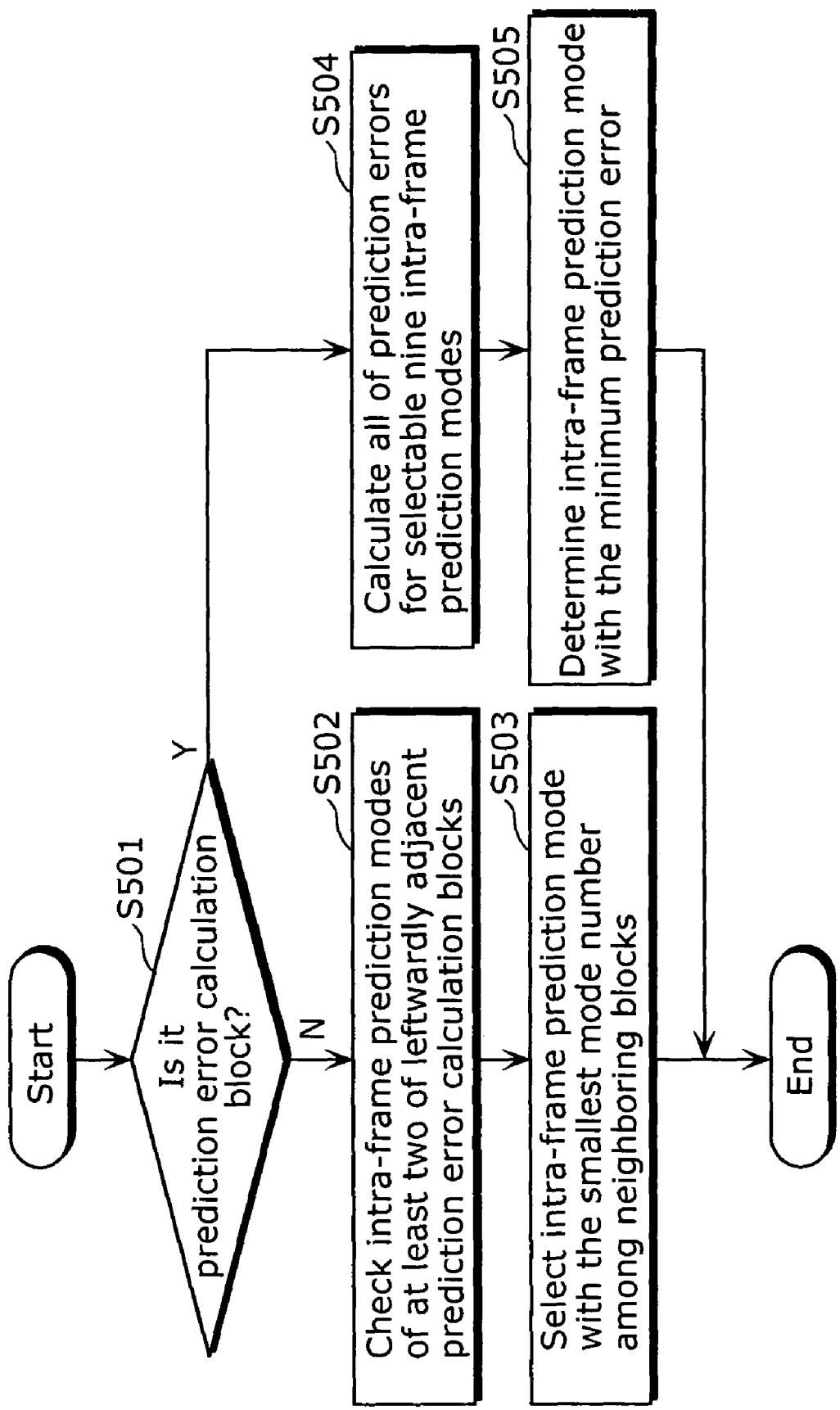
FIG. 11 is a flowchart showing a sequence of selecting the intra-frame prediction mode by the method (2)

FIG. 11 is a flowchart showing a sequence of selecting the intra-frame prediction mode by the method (2) in the macro block shown in FIG. 8. The method (2) is the method of selecting the intra-frame prediction mode with the smallest mode number from among the neighboring plural prediction error calculation blocks. The block selection unit 41 determines whether or not the 4×4 blocks in the macro block are to be the prediction error calculation blocks (S501). In the case where the 4×4 block is not to be the prediction error calculation block, in other words, the 4×4 block is determined as the non-prediction error calculation block, the prediction mode estimation unit 44 checks the intra-frame prediction modes for at least two of the coded prediction error calculation blocks located leftwardly adjacent to the non-prediction error calculation block (S502). The prediction mode estimation unit 44 selects the adjacent block having the smallest number of the intra-frame prediction mode from among the checked adjacent blocks (S503). In the case where the block selection unit 41 determines that the 4×4 blocks in the macro block are to be the prediction error calculation blocks (S501), the mode error value calculation unit 42 calculates, using the information of the current frame to be coded, the prediction errors for the respective intra-frame prediction modes, which are selectable for the block, among the nine intra-frame prediction modes (S504). The inter-mode comparison unit 43 compares the prediction errors for the respective intra-frame prediction modes, and determines the prediction error having the minimum value. The intra-frame prediction mode corresponding to the prediction error is determined as the intra-frame prediction mode for the current block to be coded which has been determined as the prediction error calculation block (S505).

Figure 12:
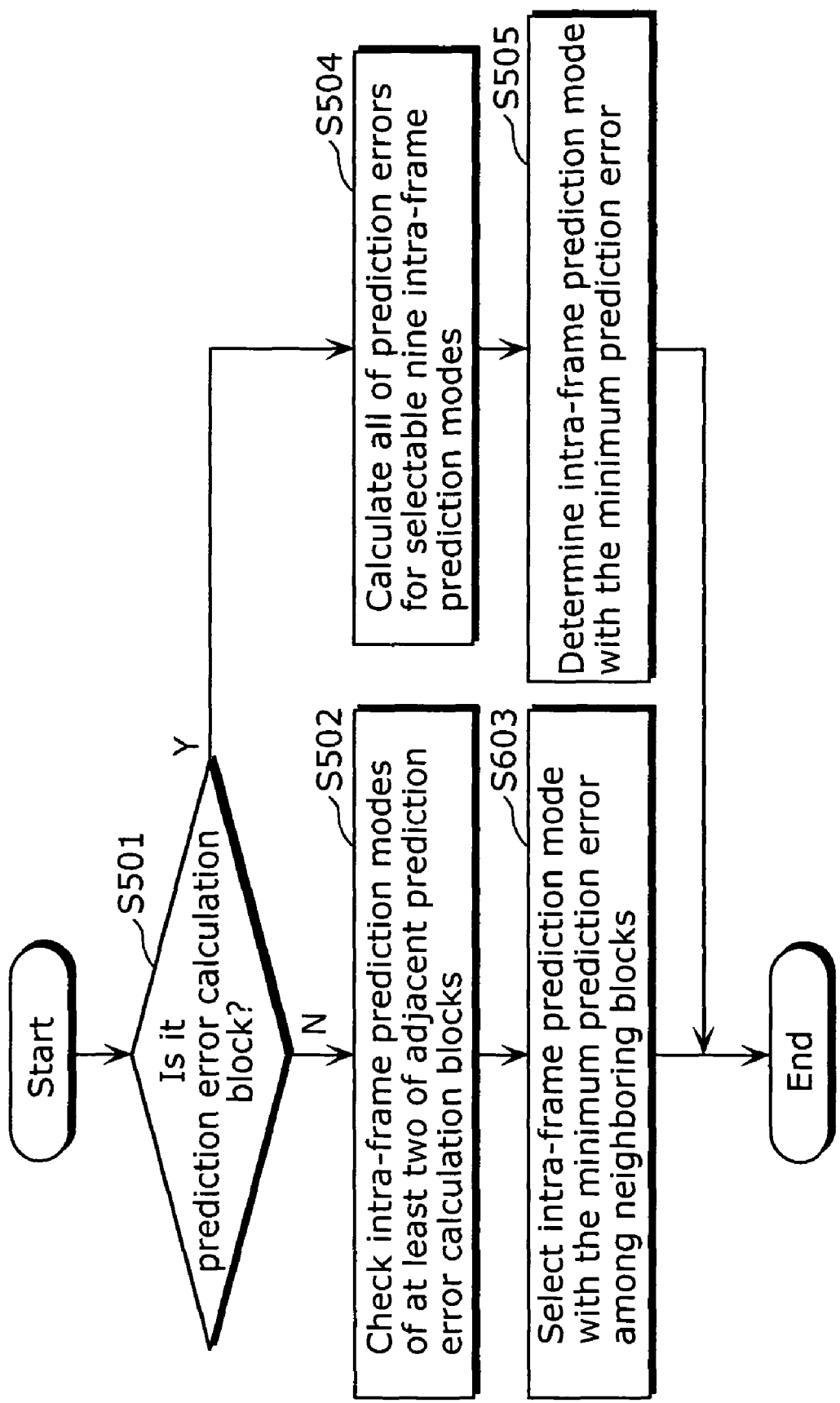
FIG. 12 is a flowchart showing a sequence of selecting the intra-frame prediction mode by the method (3)

FIG. 12 is a flowchart showing a sequence of selecting the intra-frame prediction mode by the method (3) in the macro block shown in FIG. 8. The method (3) is the method of selecting the intra-frame prediction mode with the minimum estimation value calculated from the prediction error value from among the neighboring plural prediction error calculation blocks. The block selection unit 41 determines whether or not the 4×4 blocks in the macro block are to be the prediction error calculation blocks (S501). In the case where the 4×4 block is not to be the prediction error calculation block, in other words, the 4×4 block is determined as the non-prediction error calculation block, the prediction mode estimation unit 44 checks the intra-frame prediction modes for at least two of the coded prediction error calculation blocks located leftwardly adjacent to the non-prediction error calculation block (S502). The prediction mode estimation unit 44 selects the smallest prediction values from among the checked prediction error calculation blocks (S603). In the case where the block selection unit 41 determines that the 4×4 blocks in the macro block are to be the prediction error calculation blocks (S501), the mode error value calculation unit 42 calculates, using the information on the current frame to be coded, the prediction errors for the respective intra-frame prediction modes, which are selectable for the block, among the nine intra-frame prediction modes (S504). The inter-mode comparison unit 43 compares the prediction errors for the respective intra-frame prediction modes, and determines the prediction error having the minimum value. The intra-frame prediction mode corresponding to the prediction error is determined as the intra-frame prediction mode for the current block to be coded which has been determined as the prediction error calculation block (S505).

Figure 13:
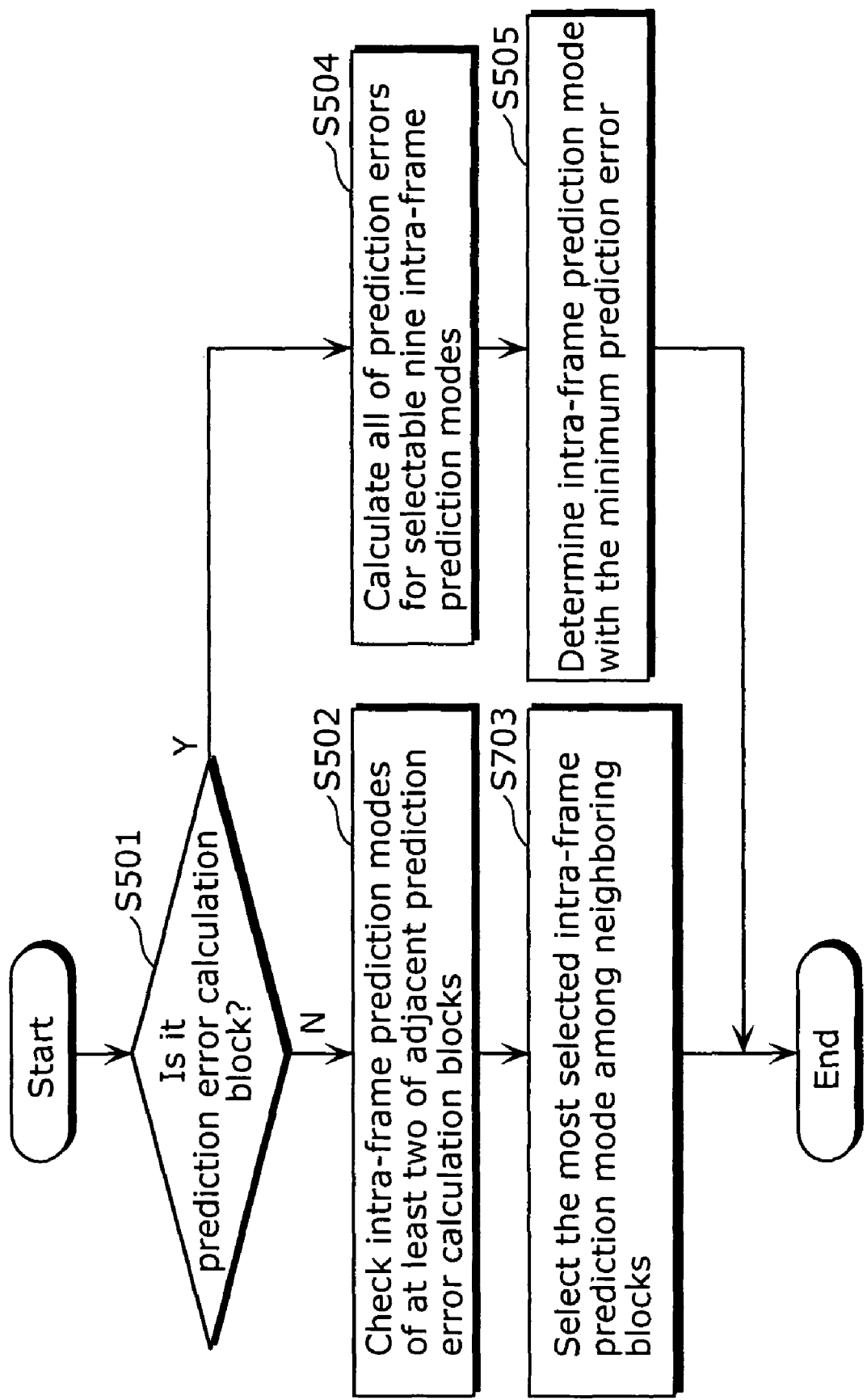
FIG. 13 is a flowchart showing a sequence of selecting the intra-frame prediction mode by the method (4)

FIG. 13 is a flowchart showing a sequence of selecting the intra-frame prediction mode by the method (4) in the macro block shown in FIG. 9. The method (4) is the method of selecting the intra-frame prediction mode which is the most selected mode among the neighboring plural prediction error calculation blocks. The block selection unit 41 determines whether or not the 4×4 blocks in the macro block are to be the prediction error calculation blocks (S501). In the case where the 4×4 block is not to be the prediction error calculation block, in other words, the 4×4 block is determined as the non-prediction error calculation block, the prediction mode estimation unit 44 checks the intra-frame prediction modes for at least two of the coded prediction error calculation blocks located leftwardly adjacent to the non-prediction error calculation block (S502). The prediction mode estimation unit 44 selects the intra-frame prediction mode which is the most selected mode among the checked adjacent blocks (S703). In the case where the block selection unit 41 determines that the 4×4 blocks in the macro block are to be the prediction error calculation block (S501), the mode error value calculation unit 42 calculates, using the information on the current frame to be coded, the prediction errors for the respective intra-frame prediction modes, which are selectable for the block, among nine intra-frame prediction modes (S504). The inter-mode comparison unit 43 compares the prediction errors for the respective intra-frame prediction modes, and determines the prediction error having the minimum value. The intra-frame prediction mode corresponding to the prediction error is determined as the intra-frame prediction mode for the current block to be coded which has been determined as the prediction error calculation block (S505).

Figure 14:
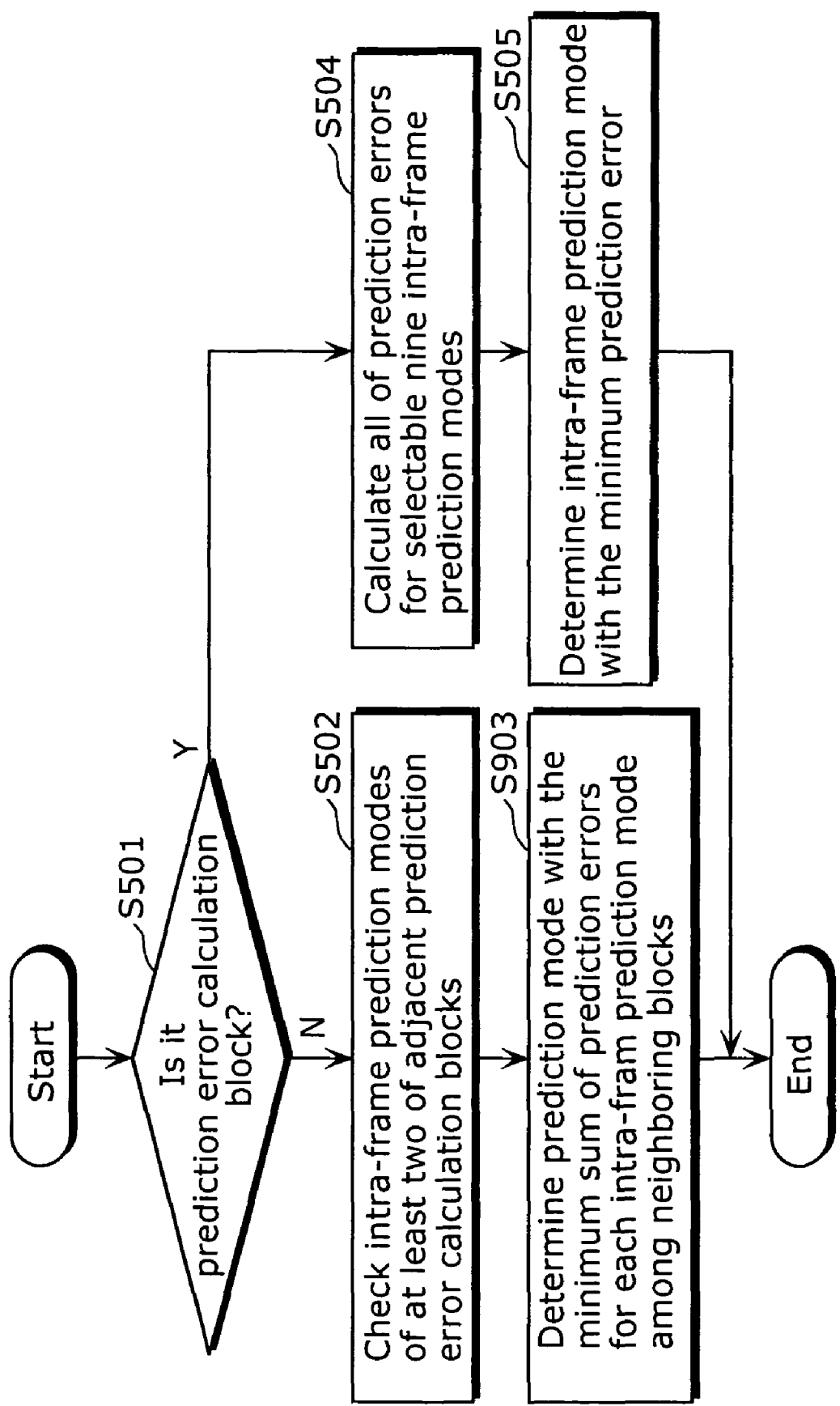
FIG. 14 is a flowchart showing a sequence of selecting the intra-frame prediction mode by the method (5)

FIG. 14 is a flowchart showing a sequence of selecting the intra-frame prediction mode by the method (5) in the macro block shown in FIG. 9. The method (5) is the method of selecting the intra-frame prediction mode having the minimum value from among the sum of the evaluated values for each intra-frame prediction mode calculated for the prediction error calculation blocks. The block selection unit 41 determines whether or not the 4×4 blocks in the macro block are to be the prediction error calculation blocks (S501). In the case where the 4×4 block is not to be the prediction error calculation block, in other words, the 4×4 block is determined as the non-prediction error calculation block, the prediction mode estimation unit 44 checks the intra-frame prediction modes for at least two of the coded prediction error calculation blocks located leftwardly adjacent to the non-prediction error calculation block (S502). The prediction mode estimation unit 44 adds the prediction error values for the respective intra-frame prediction mode, and selects the intra-frame prediction mode having the minimum additional value (S903). In the case where the block selection unit 41 determines the 4×4 blocks in the macro block are to be the prediction error calculation block (S501), the mode error value calculation unit 42 calculates, using the information on the current frame to be coded, the prediction errors for the respective intra-frame prediction modes, which are selectable for the block, among nine intra-frame prediction modes (S504). The inter-mode comparison unit 43 compares the prediction errors for the respective intra-frame prediction modes, and determines the prediction error having the minimum value. The intra-frame prediction mode corresponding to the prediction error is determined as the intra-frame prediction mode for the current block to be coded which has been determined as the prediction error calculation block (S505).

Figure 15A:
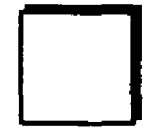
FIG. 15A is a drawing showing that the prediction error of only the 4×4 block on the upper left-hand side in the 8×8 block is calculated as an example, and that the intra-frame prediction mode determined for the 4×4 block on the upper left-hand side is selected for the other three of the 4×4 non-prediction calculation blocks as an example.
Figure 15B:
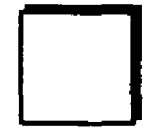
FIG. 15B is a drawing showing that the 8×8 block is regarded as one unit, and the prediction errors of the 4×4 blocks on the upper left and the lower left-hand sides are calculated as an example, and that the intra-frame prediction modes for the 4×4 blocks leftwardly adjacent to the non-prediction error calculation blocks on the upper right and the lower right-hand sides are respectively selected.
Figure 15C:
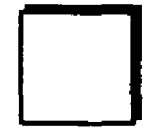
FIG. 15C is a diagram showing that the 8×8 block is regarded as one unit, and the prediction errors of the 4×4 blocks on the upper left and the upper right-hand sides are calculated as an example, and that the intra-frame prediction modes for the 4×4 blocks upwardly adjacent to the non-prediction error calculation blocks on the lower right and the lower left-hand sides are respectively selected.

FIG. 15A to FIG. 15C are drawings showing examples of the selection method by the method (1) of the intra-frame prediction mode for the non-prediction error calculation block, which is determined as a non-prediction error calculation block after divided into prediction error calculation block and non-prediction error calculation block. FIG. 15A is a diagram showing the prediction error of only the 4×4 block on the upper left-hand side in the 8×8 block is calculated as an example, and then the intra-frame prediction mode determined for the 4×4 block on the upper left-hand side is selected as the intra-frame prediction mode for the other three of the 4×4 non-prediction calculation blocks. According to this method, for example in the case where the intra-frame prediction mode "0" is determined for the 4×4 block on the upper left-hand side in the 8×8 block on the upper left-hand side in the macro block, the intra-frame prediction mode "0" is also selected for the entire 8×8 block on the upper left-hand side (the other three 4×4 blocks). On the other hand, in the 8×8 block on the upper right-hand side, the intra-frame prediction mode "4" is determined for the 4×4 block on the upper left-hand side, and therefore the intra-frame prediction mode "4" is selected for the other three 4×4 blocks on the upper left-hand side. In the same way, in the 8×8 block on the lower left-hand side, the intra-frame prediction mode "8" is selected, while in the 8×8 block on the lower right-hand side, the intra-frame prediction mode "3" is selected based on the mode for the 4×4 block on the upper left-hand side.

FIG. 15B is a diagram showing the 8×8 block is regarded as one unit, and the prediction errors of the 4×4 blocks on the upper left and the lower left-hand sides are calculated as an example. Based on these prediction errors, the intra-frame prediction modes for the 4×4 blocks leftwardly adjacent to the non-prediction error calculation blocks on the upper right and the lower right-hand sides are respectively selected. As shown in FIG. 15B, in the case where the intra-frame prediction mode "0" is determined in the 4×4 prediction error calculation block on the upper left-hand side, the intra-frame prediction mode "0" is selected for the 4×4 non-prediction error calculation block rightwardly adjacent to the prediction error calculation block. Moreover in the case where the intra-frame prediction mode "2" is determined in the 4×4 prediction error calculation block on the lower left-hand side, the intra-frame prediction mode "2" is selected for the 4×4 non-prediction error calculation block rightwardly adjacent to the prediction error calculation-block. In the same way the same intra-frame prediction mode determined for the prediction error calculation block is selected for the 4×4 non-prediction error calculation block located rightwardly adjacent to the prediction error calculation block.

FIG. 15C is a diagram showing the 8×8 block is regarded as one unit, and the prediction errors of the 4×4 blocks on the upper left and the upper right-hand sides are calculated as an example. Based on these prediction errors, the intra-frame prediction modes for the 4×4 blocks upwardly adjacent to the non-prediction error calculation blocks on the lower right and the lower left-hand sides are respectively selected. As shown in FIG. 15C, in the case where the intra-frame prediction mode "0" is determined in the 4×4 prediction error calculation block on the upper left-hand side, the intra-frame prediction mode "0" is selected for the 4×4 non-prediction error calculation block downwardly adjacent to the prediction error calculation block. In the same way the same intra-frame prediction mode determined for the prediction error calculation block is selected for the 4×4 non-prediction error calculation block located downwardly adjacent to the prediction error calculation block.

The selection method is not limited to the aforementioned examples, but any selection methods can be used. It is not necessary to select the intra-frame prediction mode from among the neighboring blocks, but a particular intra-frame prediction mode can be used. For example the intra-frame prediction mode "0" may be always used for a certain non-prediction error calculation block.

It should be noted that only the case of the 4×4 intra-frame prediction mode is described in the aforementioned embodiment, however the present invention is not limited to this case.

For example the embodiment can be applied to the cases of the 8×8 intra-frame prediction mode and the 16×16 intra-frame prediction mode.

The intra-frame prediction mode of the current block to be coded is determined in line with the aforementioned step, and the determined mode as selection coding method information is outputted from the coding method selection unit 50.

Second Embodiment

Hereafter a second embodiment of the present invention will be described referring to the respective drawings.

The whole configuration of image coding apparatus 1 of the second embodiment is the same as the first embodiment shown in FIG. 4, and therefore the description is not included here.

Figure 16:
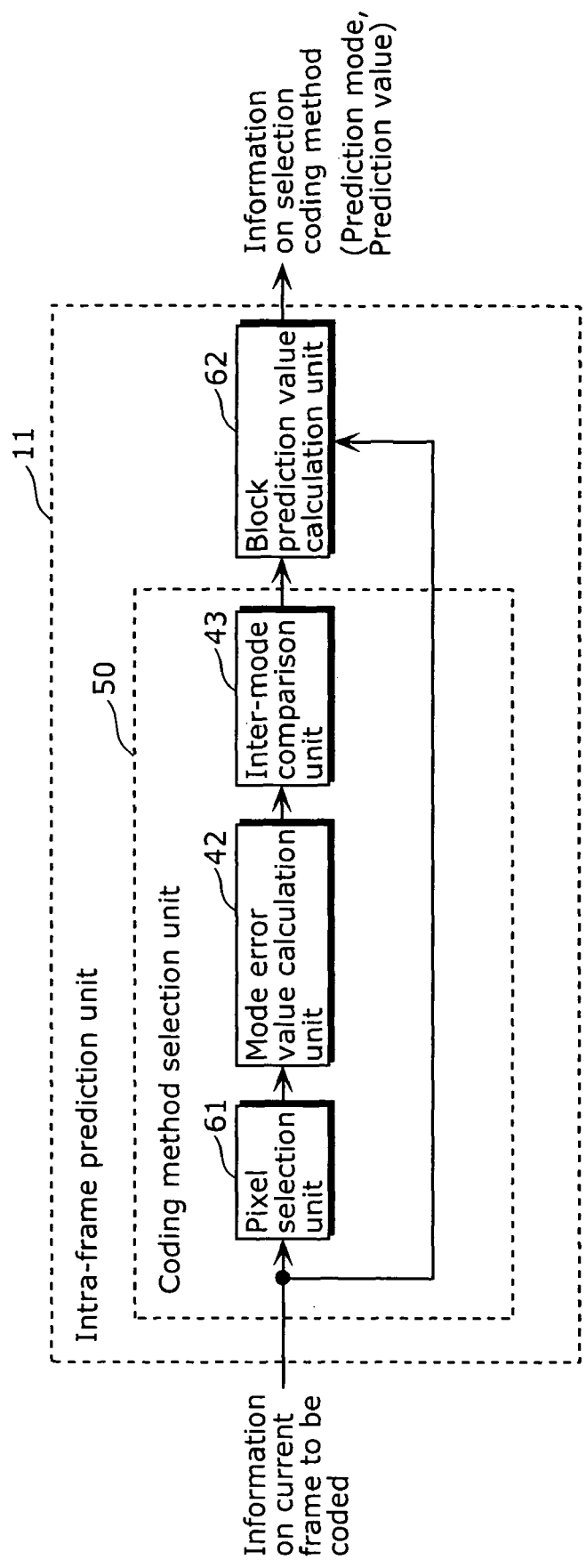
FIG. 16 is a block diagram showing the configuration of the intra-frame prediction unit for the second embodiment of the present invention.

FIG. 16 is a block diagram showing the configuration of the intra-frame prediction unit 11 for the second embodiment of the present invention. The intra-frame prediction unit 11 calculates the prediction errors of the 8×8 block in the 16×16 macro block by skipping some pixels, and determines the intra-frame prediction mode of the 4×4 block in the 8×8 block. The intra-frame prediction unit 11 includes a pixel selection unit 61, a mode error value calculation unit 42, an inter-mode comparison unit 43, and a block prediction value calculation unit 62.

Here the prediction error calculation unit corresponds to the block prediction value calculation unit 62, the macro block mode determination unit corresponds to the pixel selection unit 61, the mode error value calculation unit 42 and the inter-mode comparison unit 43.

The image information of the current frame to be coded is inputted to the pixel selection unit 61 from an external device.

In the pixel selection unit 61, a pixel which is used for calculating the prediction error for each intra-frame prediction mode is selected out of the 64 pixels in the 8×8 block including the current block to be coded.

Figure 17B:
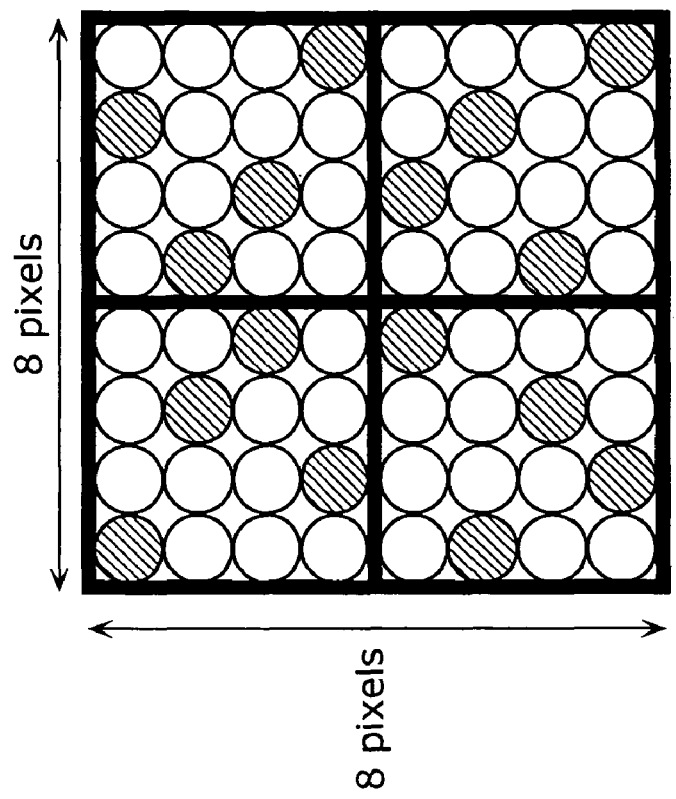
FIG. 17B is a drawing showing an example that only the 16 pixels are selected out of the 64 pixels at the time of calculation of the prediction error of the 8×8 block.
Figure 17A:
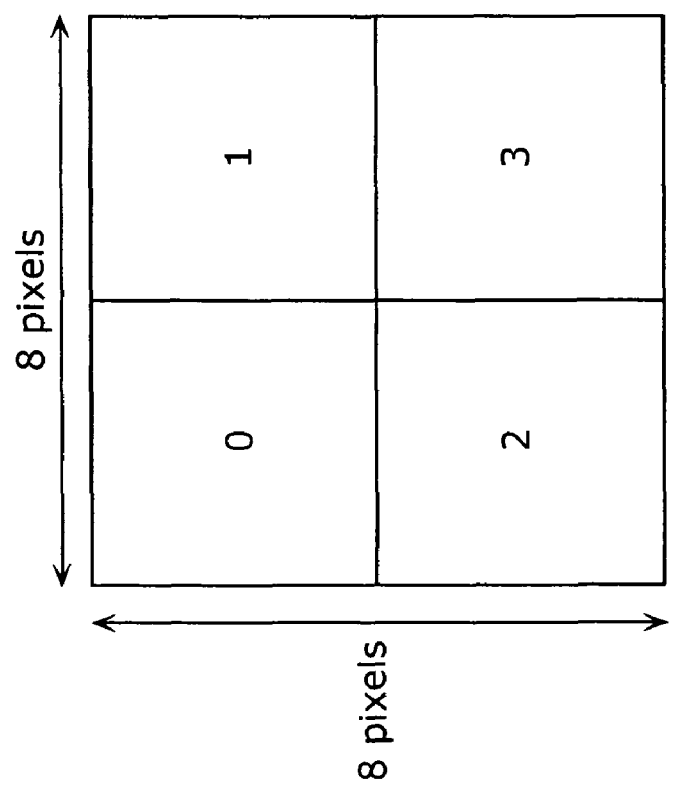
FIG. 17A is a drawing showing the prediction error calculation block of the 8×8 block having four 4×4 non-prediction error calculation block.

FIG. 17 is a drawing showing the 16 pixels, which are used for calculating the prediction errors for the all of the selectable intra-frame prediction modes, are selected out of the 64 pixels in the 8×8 block as an example. In FIG. 17, the pixels selected are shown by hatched lines. The pixels not-selected are shown by white circles. In the present embodiment, the pixel selection unit 61 selects pixels, which are used for calculating the prediction errors, to be located evenly in the 8×8 block. More specifically the same number of pixels is selected for the respective 4×4 blocks, and also the same number of the pixels located on the same row and the pixels located on the same column are respectively selected. In other words the pixels are selected considering that the selected pixels are not located on one side in the block, and also more neighboring pixels can be used for references for all of the selectable intra-frame prediction mode.

Figure 18:
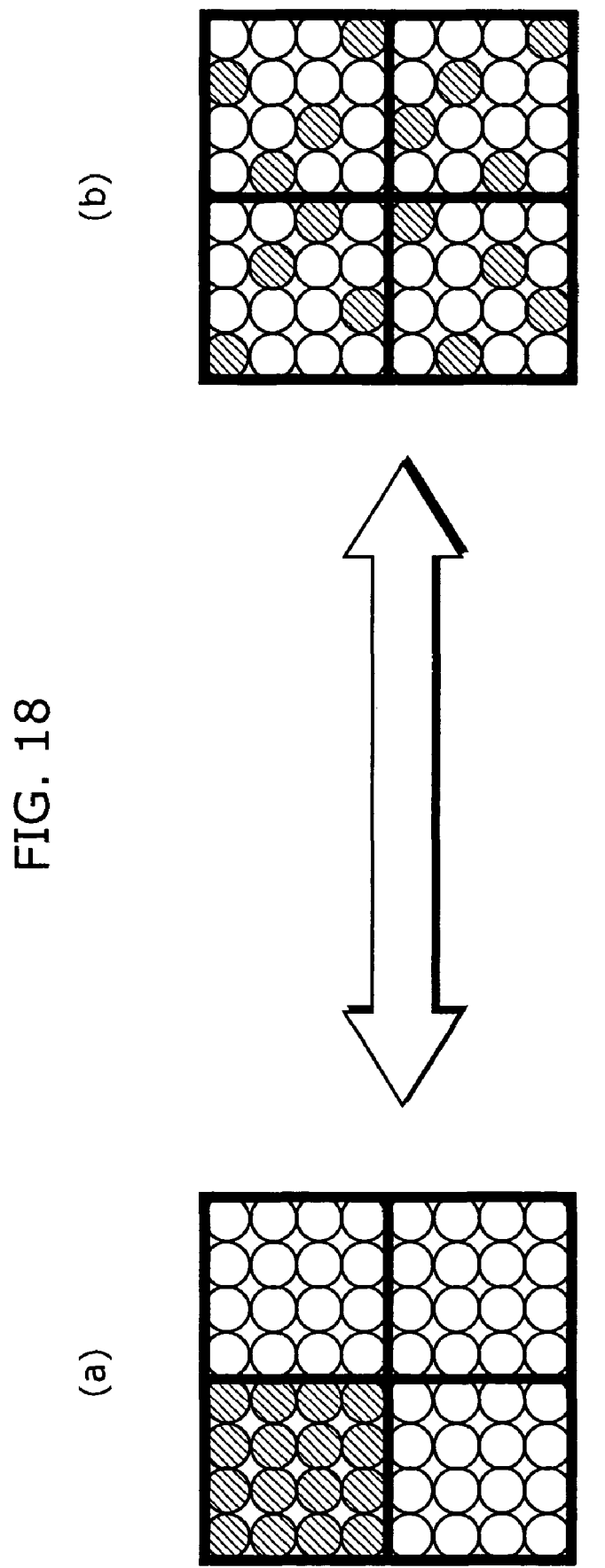
FIG. 18(a) is a drawing showing the number of pixels in the 4×4 block.
FIG. 18(b) is a drawing showing the number of pixels in the 8×8 block after skipping pixels.

FIG. 18(*a*) is a drawing showing the number of pixels in the 4×4 block. FIG. 18(*b*) is a drawing showing the number of pixels in the 8×8 block after skipping pixels. As shown in FIG. 18(*a*) and FIG. 18(*b*), the number of pixels are the same in the 4×4 block and the 8×8 block, and therefore the amount of the operations executed by the mode error value calculation unit 42 is the same for the cases (a) calculating the prediction errors of the 4×4 block without skipping pixels, and (b) calculating the prediction errors of the 8×8 block by skipping pixels and selecting the same number of pixels as the 4×4 block. According to this method, the pixels, which are used for calculating the prediction errors, are located evenly in the 8×8 block, and thereby the pixel values in 8×8 block for the respective intra-frame prediction modes are evenly reflected in the result of the prediction errors. Accordingly the more accurate intra-frame prediction can be expected in the case of selecting (b) the intra-frame prediction mode based on the prediction errors calculated by the pixel values located evenly in the 8×8 block, rather than selecting (a) the intra-frame prediction mode based on the prediction errors calculated by the pixel values in the 4×4 block on the upper left-hand side only.

Figure 1:
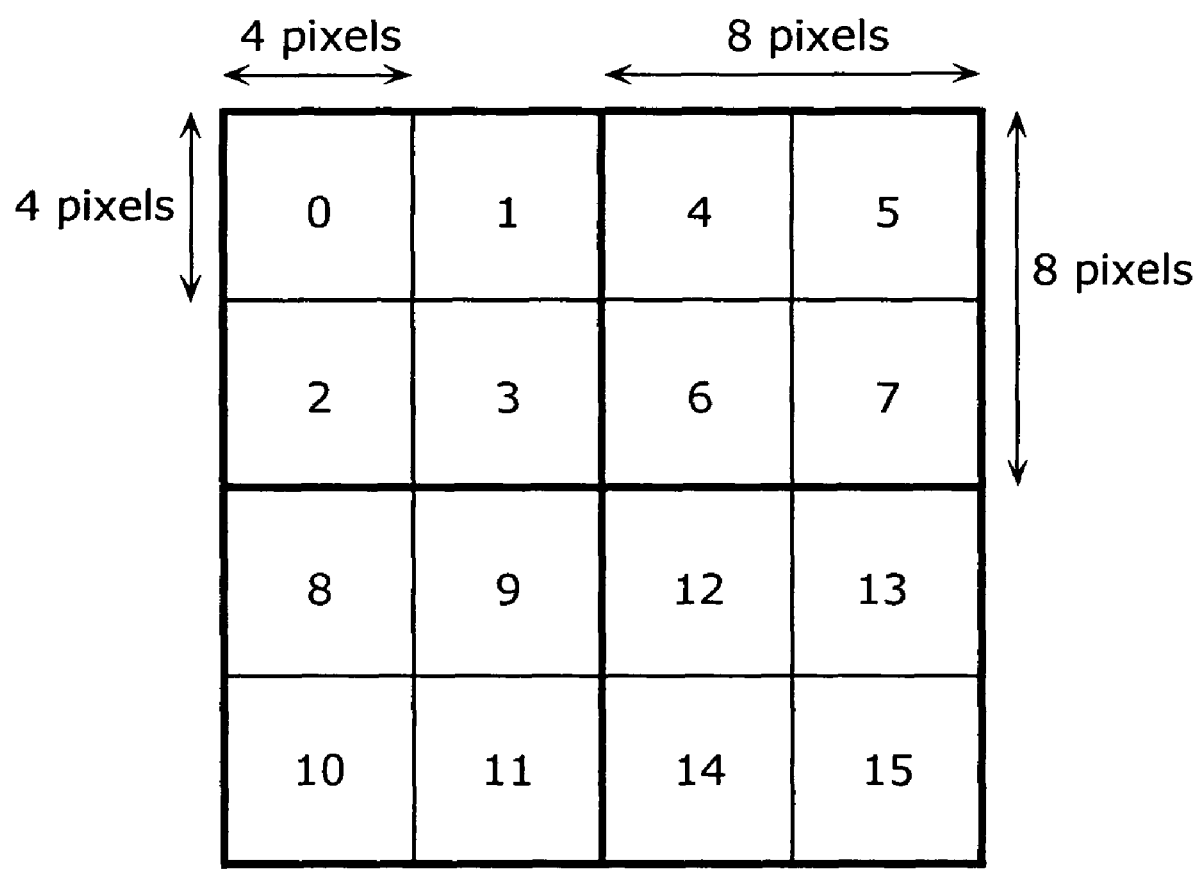
FIG. 1 is a drawing showing a coding sequence for each 4×4 block in a macro block.
Figure 2A:
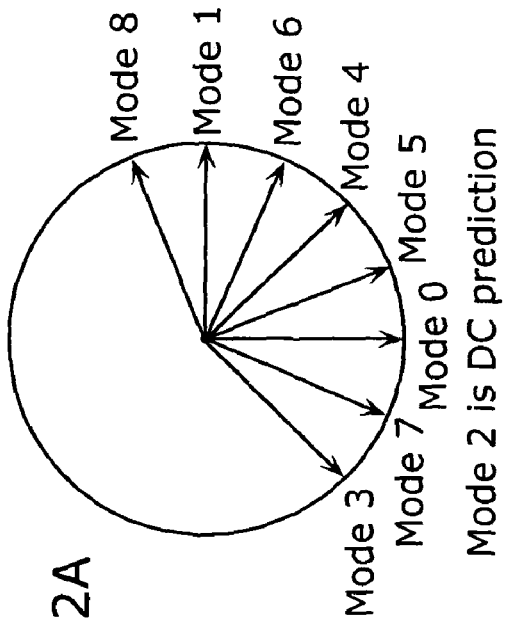
FIG. 2A is a drawing showing nine intra-frame prediction modes in the intra coding.
Figure 2B:
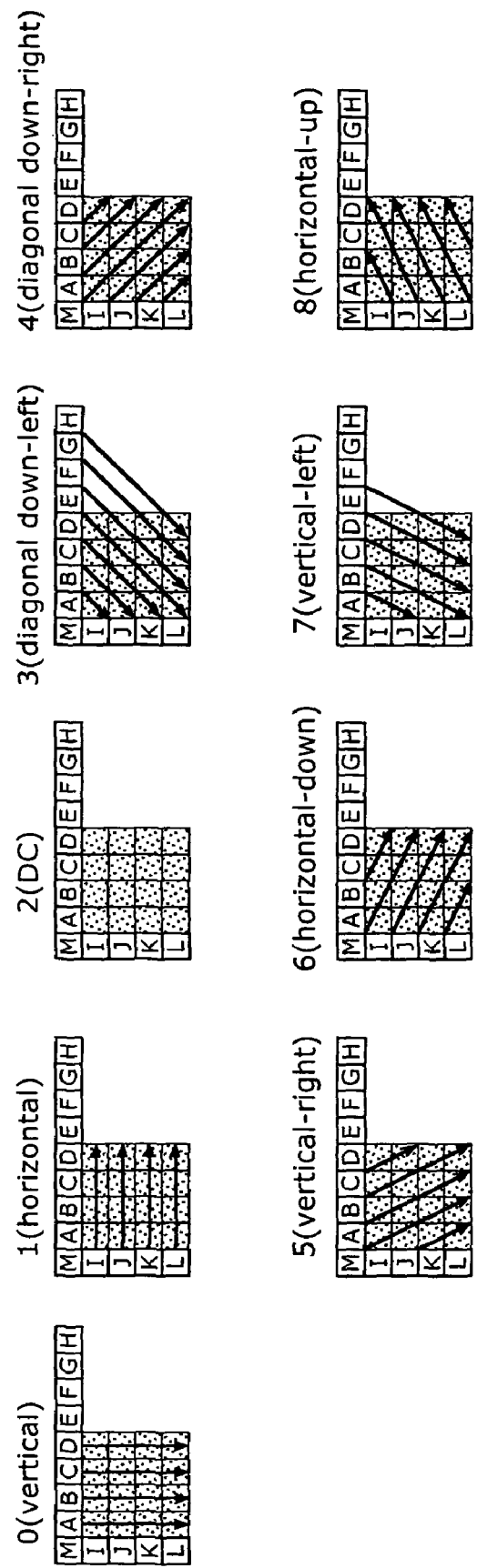
FIG. 2B is a drawing showing calculation methods of the respective prediction error corresponding to the nine intra-frame prediction modes shown in FIG. 2A.
Figure 3:
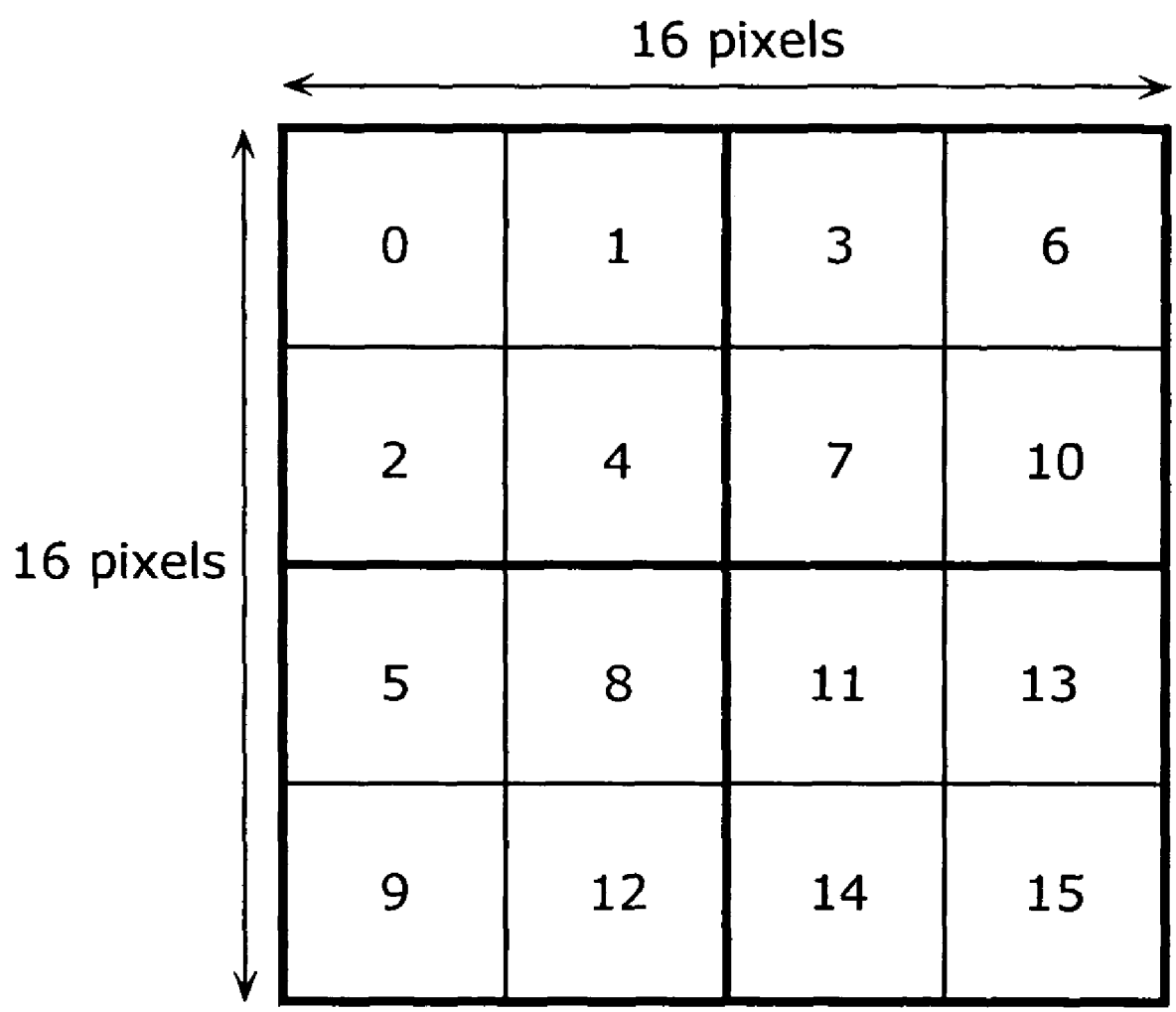
FIG. 3 is a drawing showing a coding sequence of a block by a conventional technique so as to realize an improvement in a speed in processing by means of pipeline processing of the intra-frame prediction of 4×4 block.
Figure 19B:
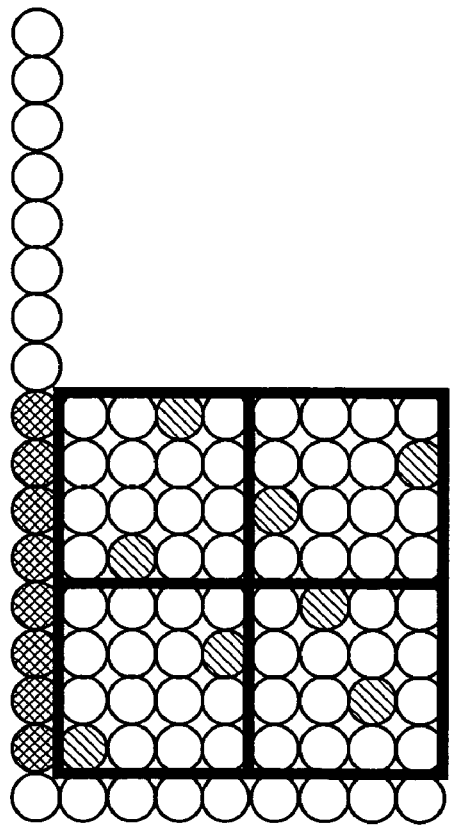
FIG. 19B is a drawing showing the neighboring pixels which are referred to in the case where the all pixels located on the diagonal from the upper left to the lower right-hand side by the intra-frame prediction mode "0" in the 8×8 block.
Figure 19A:
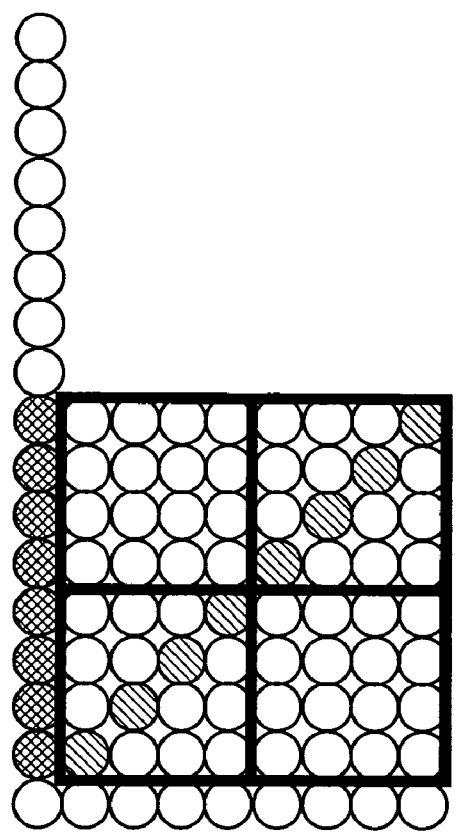
FIG. 19A is a drawing showing the neighboring pixels which are referred to in the case where the pixels in the 8×8 block are selected evenly by the intra-frame prediction mode "0".

FIG. 19A is a drawing showing the neighboring pixels which are referred to in the case where the pixels in the 8×8 block are selected evenly by the intra-frame prediction mode "0", while FIG. 19B is a drawing showing the neighboring pixels which are referred to in the case where the all pixels located on the diagonal from the upper left to the lower right-hand side by the intra-frame prediction mode "0" in the 8×8 block. In FIG. 19A the neighboring pixels to be referred to are denoted by checks. As shown in FIG. 2B the prediction errors are calculated in vertical direction to the block by the intra-frame prediction mode "0". On the other hand in the block in FIG. 19A, the selected pixels, which are used for calculating the prediction errors, are located evenly in the 8×8 block. Accordingly 8 pixels from among the pixels on the lower-most row in the coded block upwardly adjacent to the current block are referred to, since the pixels exist on the every column in the block. By this mode "0", in the block shown in FIG. 19B, the selected pixels are located on the diagonal from the upper left to the lower right-hand side, and the same number of pixels as FIG. 19A, that is 8 pixels, from among the pixels on the lower-most row in the coded block upwardly adjacent to the current block are referred to, since the pixels exist on the every column in the block.

Figure 20B:
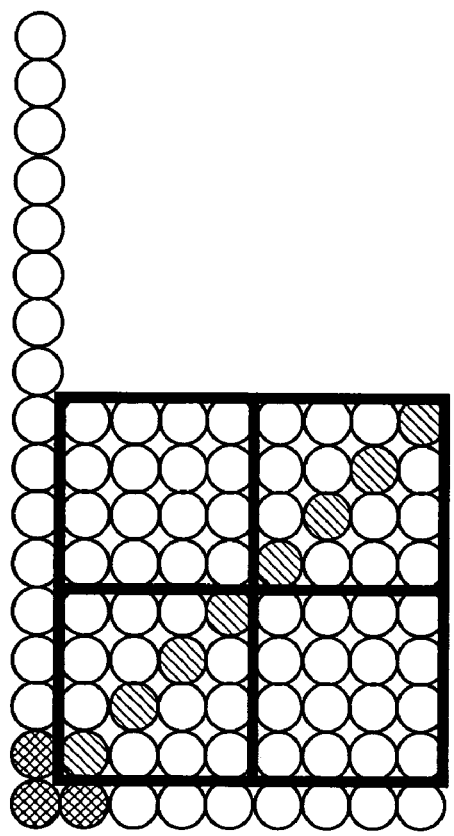
FIG. 20B is a drawing showing the neighboring pixels to be referred to in the case where the pixels are located on the diagonal from the upper left-down to the lower right-hand side in the inter-frame prediction mode 4.
Figure 20A:
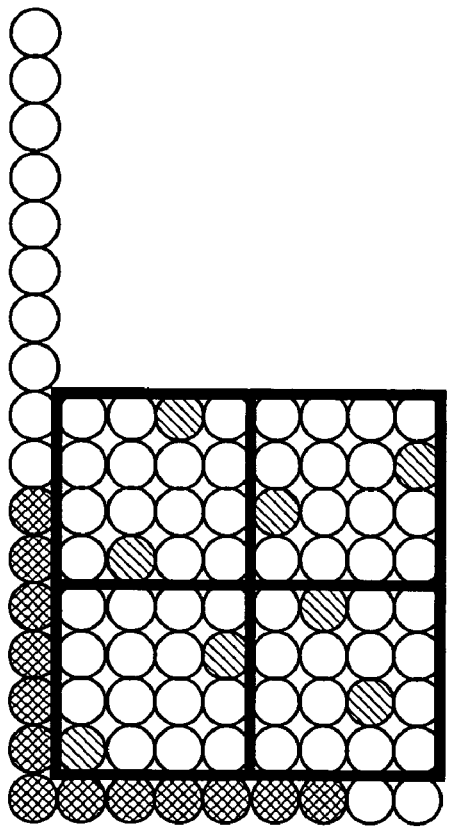
FIG. 20A is a drawing showing the neighboring pixels to be referred to in the case where the pixels are located evenly in the 8×8 block by the intra-frame prediction mode 4.

FIG. 20A is a drawing showing the neighboring pixels to be referred to in the case where the selected pixels are located evenly in the 8×8 block by the intra-frame prediction mode 4. FIG. 20B is a drawing showing the neighboring pixels to be referred to in the case where the selected pixels are located on the diagonal from the upper left to the lower right-hand side in the inter-frame prediction mode 4. The intra-frame prediction mode 4 is a mode calculating the prediction errors in the direction from the upper left to the lower left-hand side as shown in FIG. 2B. On the other hand, in the block shown in FIG. 20A, the selected pixels, which are used for calculating the prediction errors, are located evenly in the 8×8 block, and therefore the pixels exist on almost every column. In FIG. 20A, in the upper right corner and the lower left corner, there is no pixels in the direction to the lower right respectively, and therefore 7 pixels are referred to in the lower-most row in the coded block upwardly adjacent to the current block. Moreover 7 pixels are referred to in the right-most column in the coded block leftwardly adjacent to the current block. Comparing to the case of FIG. 20A, in the block in FIG. 20B, the selected pixels are located on the diagonal from the upper left to the lower right-hand side, and all pixels are located on one line from the upper left to the lower right-hand side, and pixels do not exist on the other columns. And therefore by the intra-frame prediction mode 4, only 2 pixels are referred to in the right-most column in the coded block lefwardly adjacent to the current block.

According to the pixel selection unit 61 of the second embodiment, as seen in FIG. 19A, FIG. 19B, FIG. 20A and FIG. 20B, the selected pixels, which are used for calculating prediction errors, are located evenly in the block regardless of the direction, so that the information related to the image in the 8×8 block can be evenly reflected to the prediction errors to be calculated for all of the intra-frame prediction modes, and thereby the more accurate intra-frame prediction to the non-prediction error calculation blocks can be expected desirably.

Next the mode error value calculation unit 42 calculates the prediction errors for the respective intra-frame prediction modes, which are selectable for the current block to be coded, using the information on the current frame to be coded, for the 8×8 block using the pixels determined as being used for calculating prediction errors. The sum of absolute differences (SAD) and the sum of squared differences (SSD) are generally used for the prediction error. Here only the selected pixels are used for calculating the prediction errors, not using the 64 pixels, and therefore the amount of operations can be reduced.

Next the inter-mode comparison unit 43 compares the prediction errors for the respective intra-frame prediction modes, and determines the prediction error having the minimum value. The intra-frame prediction mode corresponding to the prediction error is determined as the intra-frame prediction mode for all of the 4×4 blocks included in the 8×8 block.

Next block prediction value calculation unit 62 calculates the prediction errors using the determined intra-frame prediction mode and all pixels in the block. In the H.264 standard, the available profiles for the 8×8 intra-frame prediction mode are limited, and the prediction mode can not be used in the main profile. According to the aforementioned method, the amount of operations can be reduced effectively in determining the intra-frame prediction mode for all of the 4×4 blocks in the 8×8 block.

With regard to the high-profile available for the 8×8 intra-frame prediction mode, the 8×8 intra-frame prediction can be executed without executing 4×4 intra-frame prediction using the determined 8×8 intra-frame prediction mode.

Figure 21:
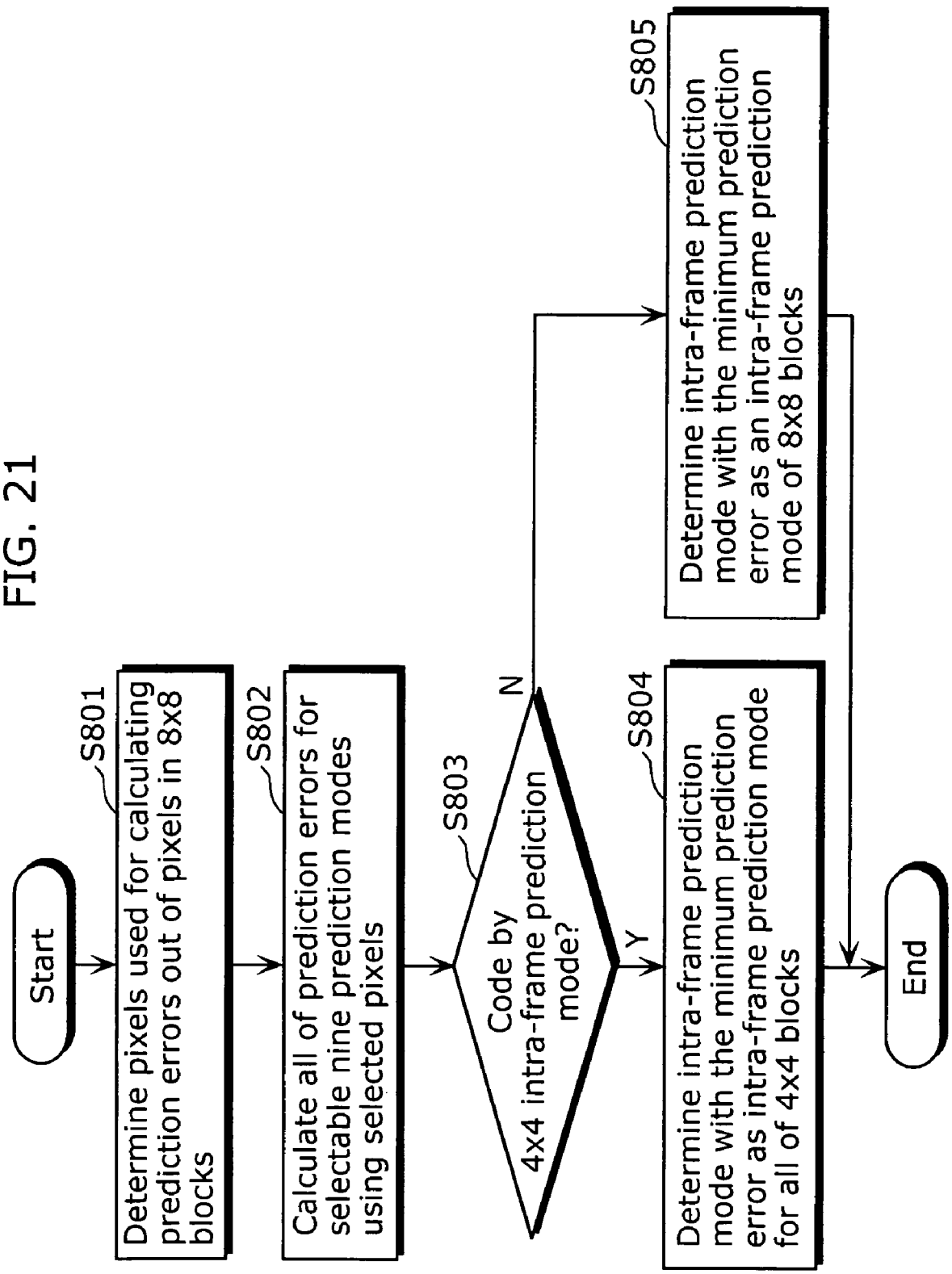
FIG. 21 is a flowchart showing a sequence of selecting the intra-frame prediction mode by skipping pixels.

FIG. 21 is a flowchart showing a sequence of determining the intra-frame prediction mode by skipping pixels in the 8×8 block shown in FIG. 17. In other words the prediction errors are calculated by skipping pixels in 8×8 block, and the intra-frame prediction mode having the minimum prediction error value is selected in the method. The pixel selection unit 61 selects the pixels which are used for the prediction error calculation in the 8×8 block (S801). The block prediction value calculation unit 62 calculates the prediction errors for the respective intra-frame prediction modes, which are selectable for the block, from among the 9 intra-frame prediction modes (S802) using the selected pixels. Next it is judged that the 8×8 block is coded by the 4×4 intra-frame prediction or the 8×8 intra-frame prediction (S803). Next the inter-mode comparison unit 43 determines that the prediction mode having the minimum value of the prediction error is the intra-frame prediction mode for all of the 4×4 block in the 8×8 block in the case of coding by the 4×4 intra-frame prediction (S804), while the prediction mode having the minimum value of the prediction error is the intra-frame prediction mode for the 8×8 block in the case of coding by the 8×8 intra-frame prediction (S805).

Furthermore the functional blocks shown in FIG. 5 for the aforementioned embodiments can be realized as LSI as integrated circuit representatively. The LSI can be a single chip or can be plural chips. The LSI, which is exemplified here, is called as IC, System LSI, Super LSI, Ultra LSI and the like.

Additionally, the manner of integrated circuit can be realized not only as the LSI, but also as the dedicated line and the general-purpose processor. After manufacturing the LSI, a programmable Field Programmable Gate Array (FPGA) and a connection and setup of the circuit cell in the LSI may use a reconfigurable processor.

Moreover, when further progressed or derivative technology on semiconductor to replace LSI would be available in the future, the integration of the functional blocks can be obviously proceeded using the technology. The application to biotechnology and so on can be expected.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

According to the present invention, the coding method using the intra-frame prediction makes it possible to reduce the amount of the operations required for selecting the selectable intra-frame prediction modes, and therefore the processing speed of the image coding apparatus can be improved. The image coding apparatus of the present invention can be realized as an image coding apparatus equipped in the personal computer having communication function, the PDA, the mobile phone and the device in broadcasting station of digital broadcasting.

What is claimed is:

1. An image coding apparatus which codes an input frame, the apparatus comprising:

a data storage unit configured to store coded image data of pixels adjacent to a current block to be coded, the current block being one of a plurality blocks included in the input frame and including a predetermined number of pixels; and a prediction error calculation unit configured to determine one of a plurality of prediction modes and calculate a prediction error of the current block in the determined prediction mode, wherein the prediction error calculation unit is configured to determine one of the plurality of prediction modes in at least one of a first operation mode and a second operation mode, the first operation mode being a mode in which a prediction mode for the current block is determined based on (i) a plurality of prediction data calculated in the plurality of prediction modes for the image data stored in the data storage unit, and (ii) image data included in the current block, and the second operation mode being a mode in which a prediction mode for the current block is determined based on the prediction mode used for a coded block adjacent to the current block.

2. The image coding apparatus according to claim 1, wherein the prediction error calculation unit is configure to (i) determine, in the first operation mode, a prediction mode for one first block located on a fixed position relative to a second block for which a prediction mode is determined in the second operation mode when the second block is the current block, and (ii) determine the prediction mode for the second block by using the prediction mode determined in the first operation mode.

3. The image coding apparatus according to claim 1, wherein the prediction error calculation unit is configured to (i) determine, in the first operation mode, a plurality of prediction modes for a plurality of first blocks located on fixed positions relative to a second block for which a prediction mode is determined in the second operation mode when the second block is the current block, and (ii) determine, as the prediction mode for the second block, a minimum value of a prediction error from among the plurality of prediction modes determined for the plurality of first blocks.

4. The image coding apparatus according to claim 1, wherein
the prediction error calculation unit is configured to (i) determine, in the first operation mode, a plurality of prediction modes for a plurality for first blocks located on fixed positions relative to a second block for which a prediction mode is determined in the second operation mode when the second block is the current block, and (ii) determine, as the prediction mode for the second block, a smallest mode number for identifying each prediction mode from among the plurality of prediction modes determined for the plurality of first blocks.

5. The image coding apparatus according to claim 1, wherein
the prediction error calculation unit is configure to (i) determine, in the first operation mode, a plurality of prediction modes for a plurality of first blocks located on fixed positions relative to a second block for which a prediction mode is determined in the second operation mode when the second block is the current block, and (ii) determine, as the prediction mode for the second block, a largest number of blocks from among the plurality of prediction modes determined for the first plurality of blocks.

6. The image coding apparatus according to claim 1, wherein
the prediction error calculation unit is configure to (i) determine, in the first operation mode, a plurality of prediction modes for a plurality of first blocks located on fixed positions relative to a second block for which a prediction mode is determined in the second operation mode when the second block is the current block, (ii) add the prediction errors for the respective prediction modes calculated for the plurality of first blocks, and (iii) determine, as the prediction mode for the second block, a minimum added value from among the values obtained.

7. The image coding apparatus according to claim 1, wherein
the prediction error calculation unit is configured to (i) determine, in the first operation mode, a prediction mode for a first block, whose size is n pixels×n pixels (n is a natural number) and which is located on an upper left-hand side within a block whose size is 2n pixels×2n pixels, and (ii) select the prediction mode, which has been determined for the block located on the upper left-hand side, as a prediction mode for each of the other three second blocks, whose size is n pixels×n pixels included in the block of 2n pixels×2n pixels.

8. The image coding apparatus according to claim 1, wherein
the prediction error calculation unit is configure to (i) determine one of the plurality of prediction modes, for a large block having the plurality of second blocks for which a prediction mode is determined in the second operation mode when the second block is the current block, (ii) calculate, in the determined prediction mode, prediction errors for the large block, (iii) determine a prediction mode for the large block based on the calculated prediction errors, and
(iv) calculate, in the prediction mode determined for the large block based on the calculated prediction errors, a prediction error of the second block included in the large block.

9. The image coding apparatus according to claim 8, wherein
the prediction error calculation unit is configured to (i) calculate prediction errors using a plurality of pixels from among pixels included in the large block, and (ii) determine the prediction mode for the large block based on the calculated prediction errors.

10. The image coding apparatus according to claim 8, wherein
the prediction error calculation unit is configured (i) select pixels to be located evenly in the large block, (ii) calculate prediction errors, and (iii) determine the prediction mode for the large block.

11. An image coding method performed by an image coding apparatus which includes a data storage unit storing coded image data of pixels adjacent to a current block to be coded and codes an input frame, the current block being one of a plurality of blocks included in the input frame and including a predetermined number of pixels, the method comprising:
determining one of a plurality of prediction modes and calculating a prediction error of the current block in the determined prediction mode using a prediction error calculation unit; and
determining, in the prediction error calculation unit, one of the plurality of prediction modes in at least one of a first operation mode and a second operation mode, the first operation mode being a mode in which a prediction mode for the current block is determined based on (i) a plurality of prediction data calculated in the plurality of prediction modes for the image data stored in the data storage unit, and (ii) image data included in the current block, and the second operation mode being a mode in which a prediction mode for the current block is determined based on a prediction mode used for a coded block adjacent to the current block.

12. The image coding method according to claim 11, further comprising:
in the prediction error calculation unit (i) determining, in the first operation mode, a prediction mode for one or more first blocks located on fixed positions relative to a second block for which a prediction mode is determined in the second operation mode when the second block is the current block, and (ii) determining the prediction mode for the second block in the prediction mode determined in the first operation mode.

13. A program recorded on a non-transitory computer-readable recording medium for use in an image coding apparatus which includes a data storage unit storing coded image data of pixels adjacent to a current block to be coded and codes an input frame, the current block being one of a plurality of blocks included in the input frame and including a predetermined number of pixels, the program causing a computer to execute steps comprising:
determining one of a plurality of prediction modes and calculating a prediction error of the current block in the determined prediction mode using a prediction error calculation unit; and
determining, in the prediction error calculation unit, one of the plurality of prediction modes in at least one of a first operation mode and a second operation mode, the first operation mode being a mode in which a prediction mode for the current block is determined based on (i) a plurality of prediction data calculated in the plurality of prediction modes for the image data stored in the data storage unit, and (ii) image data included in the current block, and the second operation mode being a mode in which a prediction mode for the current block is determined based on a prediction mode used for a coded block adjacent to the current block.

14. A computer program according to claim 13, further comprising:

in the prediction error calculation unit (i) determining, in the first operation mode, a prediction mode for one or more first blocks located on fixed positions relative to a second block for which a prediction mode is determined in the second operation mode when the second block is the current block, and (ii) determining the prediction mode for the second block in the prediction mode determined in the first operation mode.

* * * * *